United States Patent [19]

Fernandez et al.

[11] Patent Number: 4,701,690
[45] Date of Patent: Oct. 20, 1987

[54] TRANSFER APPARATUS, REGULATING APPARATUS AND METHODS

[75] Inventors: Manuel Fernandez, University City, Mo.; Waldo J. Frierdich, Highland, Ill.

[73] Assignee: Basler Electric Company, Highland, Ill.

[21] Appl. No.: 836,833

[22] Filed: Mar. 6, 1986

Related U.S. Application Data

[63] Continuation-in-part of Ser. No. 802,712, Nov. 27, 1985.

[51] Int. Cl.[4] .............................................. H02P 9/00
[52] U.S. Cl. ........................................ 322/28; 307/64; 307/87; 322/25; 322/90; 361/18; 361/21
[58] Field of Search ................... 322/24, 25, 28, 90; 307/16, 19, 45, 64, 66, 84, 87; 323/9, 20; 361/18, 20, 21

[56] References Cited

U.S. PATENT DOCUMENTS

| | | | |
|---|---|---|---|
| 3,337,742 | 8/1967 | Baehr et al. | 307/64 |
| 3,539,820 | 11/1970 | Kessler | 307/87 |
| 3,564,391 | 2/1971 | Dinger | 322/25 |
| 3,858,108 | 12/1974 | Bray | 322/28 |
| 3,912,940 | 10/1975 | Vince | 307/64 |
| 3,984,755 | 10/1976 | Lehnhoff et al. | 322/28 |
| 4,035,716 | 7/1977 | Hutchinson | 323/20 |
| 4,090,090 | 5/1978 | Johnston | 307/87 |
| 4,096,395 | 6/1978 | Bogel et al. | 307/64 |
| 4,177,389 | 12/1979 | Schott | 307/64 |
| 4,180,745 | 12/1979 | Bartlett et al. | 307/45 |
| 4,218,647 | 8/1980 | Haas | 323/9 |
| 4,219,769 | 8/1980 | MacFarlane et al. | 322/28 |
| 4,231,029 | 10/1980 | Johnston | 340/658 |
| 4,311,919 | 1/1982 | Nail | 307/64 |
| 4,356,402 | 10/1982 | Morimoto et al. | 307/19 |
| 4,384,213 | 5/1983 | Bogel | 307/64 |
| 4,400,626 | 8/1983 | Lacy | 307/66 |
| 4,484,084 | 11/1984 | Cheffer | 307/64 |
| 4,520,275 | 5/1985 | Marusik | 307/64 |
| 4,533,863 | 8/1985 | Luhn et al. | 322/28 |
| 4,559,487 | 12/1985 | Sims et al. | 322/24 |

OTHER PUBLICATIONS

"FV200 Over and Under Voltage Protection Unit", GEC Industrial Controls Limited, 12/76, 4 pages.
"Voltage Regulator Rated 3.5 Amp", Diesel Progress North American, p. 18, undated.

*Primary Examiner*—Patrick R. Salce
*Assistant Examiner*—Anita M. Ault
*Attorney, Agent, or Firm*—Senniger, Powers, Leavitt and Roedel

[57] ABSTRACT

Transfer apparatus for use with an AC generator having a field winding, the DC energization of which controls the output of the generator. Associated with the generator are first and second voltage regulators each including means for sensing the output of the generator and means for varying the DC energization of the generator field winding to regulate the output of the generator to a respective reference level for each voltage regulator. The transfer apparatus includes a circuit for generating a first signal as a function of the generator output as sensed by the first voltage regulator sensing means and a second signal as a function of the generator output as sensed by the second voltage regulator sensing means. Another circuit independently produces an additional signal to which the first and second signals ordinarily have a predetermined relationship. A further circuit selects the first or second voltage regulator to energize the generator field winding. The selection depends on whether or not there is a departure of the first signal from the predetermined relationship to the additional signal when the second signal maintains its predetermined relationship thereto. Other transfer apparatus and regulating apparatus and methods are also disclosed.

38 Claims, 29 Drawing Figures

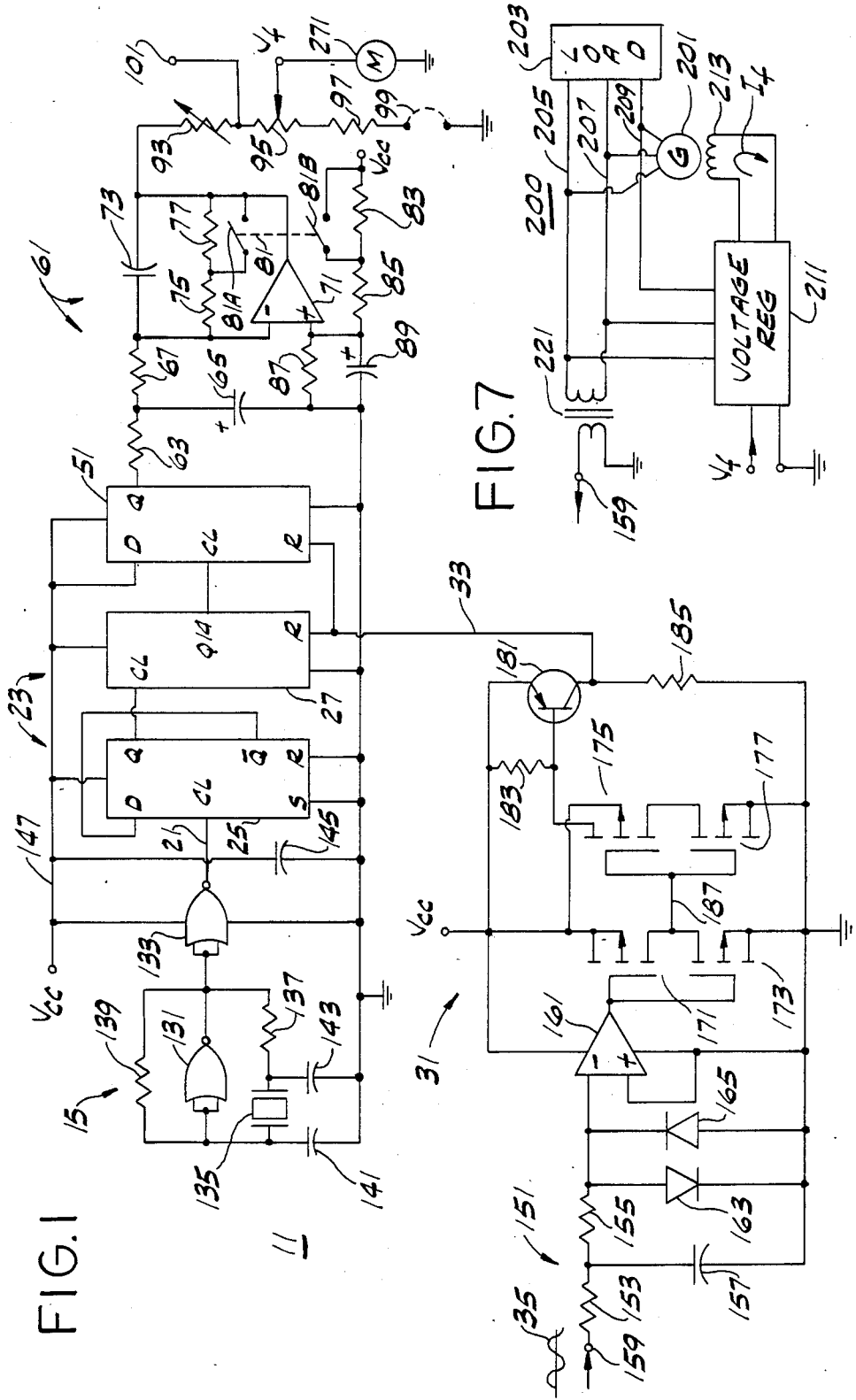

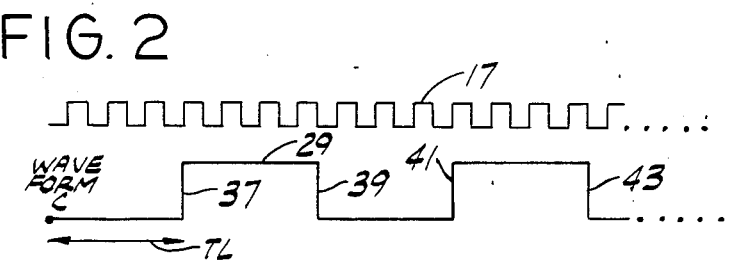
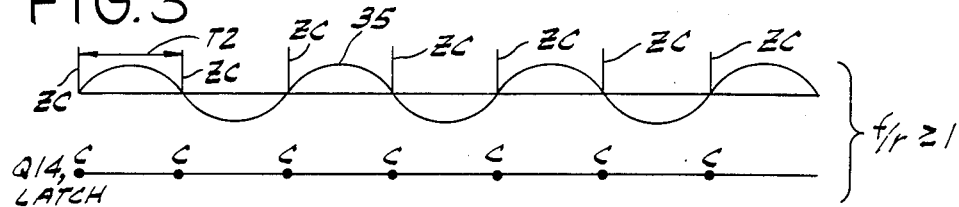
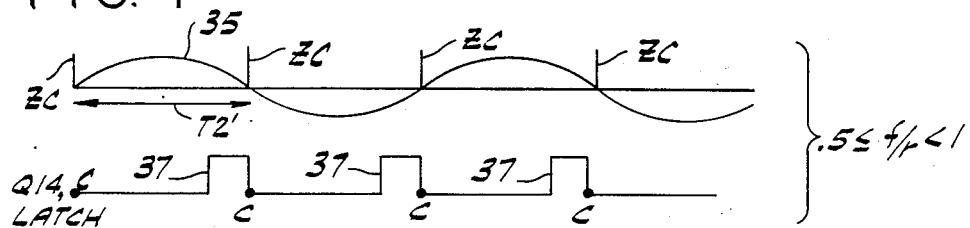
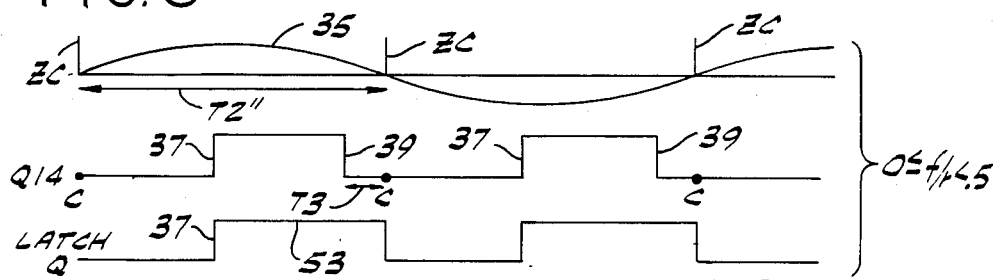
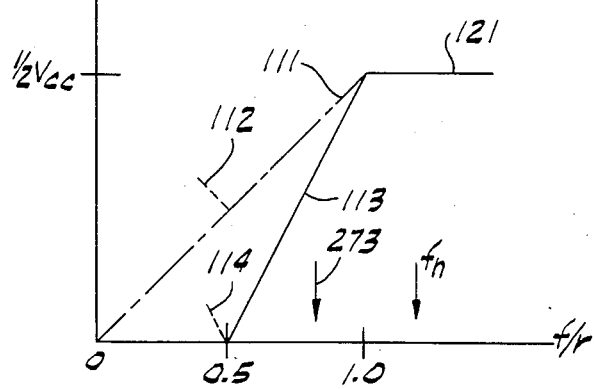
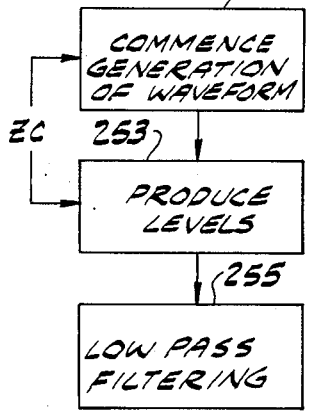

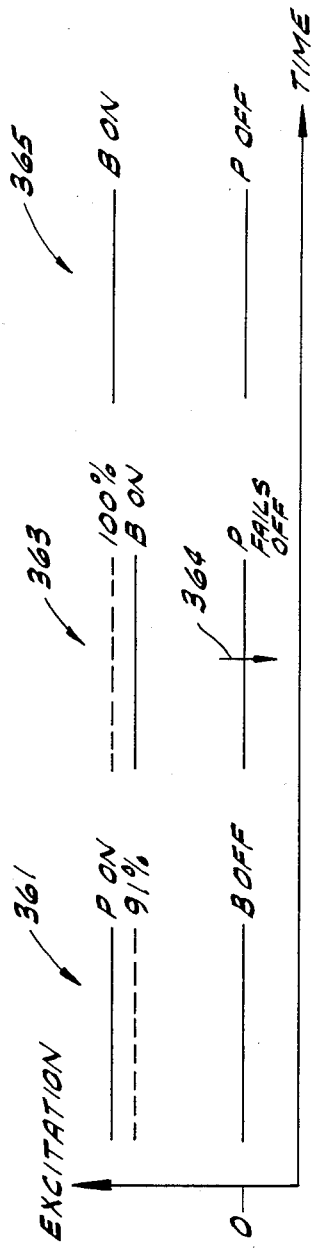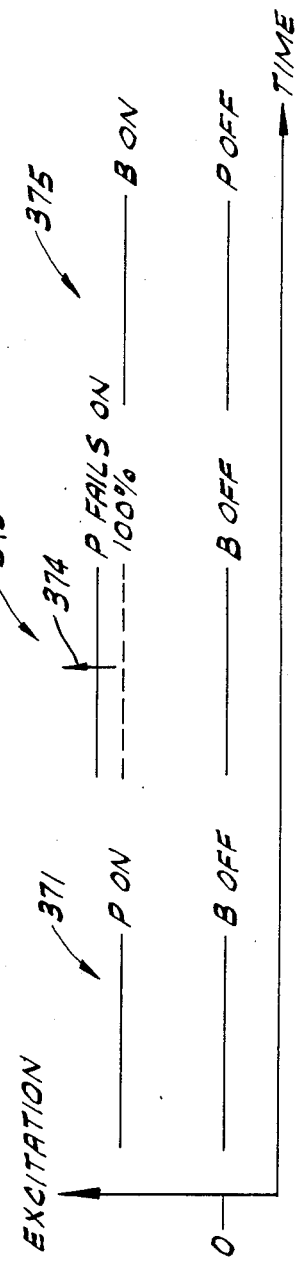

TRANSFER APPARATUS, REGULATING APPARATUS AND METHODS

CROSS REFERENCE TO RELATED APPLICATION

This application is a continuation-in-part of coassigned, copending application Ser. No. 802,712 of Waldo J. Frierdich for "Frequency Sensing Circuits and Methods" filed Nov. 27, 1985, which is incorporated by reference herein.

BACKGROUND OF THE INVENTION

The present invention relates to transfer apparatus for an alternating current (AC) electric power generator having at least two voltage regulators for supplying excitation to a field winding of the generator to regulate its voltage. The transfer apparatus is so-named because it transfers the function of regulating the generator output from one to another of the voltage regulators either manually or automatically. The invention also relates to the regulators combined with the transfer apparatus, which combination is called regulating apparatus herein. The invention also involves methods of operating the transfer apparatus.

A generator of electrical power such as an alternator or rotary exciter typically has a field winding the direct current (DC) energization of which sets up a magnetic field in the generator and thereby controls its AC output voltage. A prime mover turns a rotor of the generator, and mechanical energy is converted into electrical energy for electrical power lines to a load in a conventional manner. The rotor speed (rpm) of the generator determines the AC frequency of its output. The AC output voltage is regulated by a voltage regulator such as a shunt static exciter (SSE) which senses the generator AC voltage and varies the DC current in the generator field winding to maintain the generator output voltage level.

For demanding applications, such as naval shipboard generator installations for example, the need for the highest possible reliability of electric power has led to a need for a redundant voltage regulator scheme having at least two voltage regulators per generator. It has been known to connect two voltage regulators through diodes to the same field winding of a single generator. One voltage regulator was set to regulate the generator to a higher voltage than that for which the second regulator was set. In case the first regulator failed off, the second regulator could take over, albeit at a lower voltage. If either regulator failed on, an overvoltage in the generator output was detected, and the regulator conducting current at the time was shut off by removing its power.

When generators are connected in parallel, however, a voltage regulator failure does not necessarily cause an overvoltage in its associated generator output. Consequently, transfer and regulating apparatus and methods are needed that are compatible with multiple generator installations. Transfer apparatus and regulating apparatus should automatically reduce generator output when frequency falls, while maintaining the effectiveness of various monitoring and transferring features. Because of the importance of highly reliable power availability in particular applications, the art is also seeking new and improved types of transfer and regulating apparatus and methods capable of automatically detecting failures in particular circuits of each regulator. Apparatus and methods are needed to monitor the performance of the regulators and initiate a changeover, or transfer, from one regulator to another by solid state means without lowering the generator voltage as a result. Apparatus is also needed which is sufficiently intelligent to avoid improvidently transferring from one regulator to another due to problems external to the regulators.

SUMMARY OF THE INVENTION

Among the objects of the present invention are to provide improved transfer apparatus, regulating apparatus and methods which are compatible with single-generator or multiple-generator systems that can also be paralleled with external power sources; to provide improved transfer apparatus which can conveniently verify proper operation of its own circuits and of associated regulators; to provide improved transfer apparatus, regulating apparatus and methods that can avoid transferring from one regulator to another due to problems external to the regulators or otherwise not requiring transfer; to provide improved transfer apparatus and regulating apparatus which can detect whether a regulator is responding to the generator output sensed by it to effectively regulate the generator output to a frequency-dependent electrical reference; to provide improved transfer apparatus and regulating apparatus which can detect whether a voltage regulator is correctly sensing the output of a generator to be regulated; to provide improved transfer apparatus, regulating apparatus and methods which maintain various monitoring and transfer functions of the foregoing types when generator output is reduced with falling frequency; to provide improved transfer apparatus, regulating apparatus and methods which cause a transfer between regulators that does not lower the generator voltage at a given frequency; and to provide improved transfer apparatus and regulating apparatus of the foregoing types which are convenient to operate, effective, economical and reliable.

Generally, one form of the invention is transfer apparatus for use with an AC generator having a field winding, the DC energization of which controls the output of the generator. Associated with the generator are first and second voltage regulators each including means for sensing the output of the generator and means for varying the DC energization of the generator field winding to regulate the output of the generator to a respective reference level for each voltage regulator. The transfer apparatus includes a circuit for generating a first signal as a function of the generator output as sensed by the first voltage regulator sensing means and a second signal as a function of the generator output as sensed by the second voltage regulator sensing means. Another circuit independently produces an additional signal to which the first and second signals ordinarily have a predetermined relationship. A further circuit selects the first or second voltage regulator to energize the generator field winding. The selection depends on whether or not there is a departure of the first signal from the predetermined relationship to the additional signal when the second signal maintains its predetermined relationship thereto.

In general, another form of the invention is transfer apparatus for use with an AC generator having a field winding, the DC energization of which controls the output of the generator, and associated first and second voltage regulators connected so that the first voltage regulator ordinarily energizes the field winding. Each voltage regulator includes means for sensing the output of the generator, means for supplying a frequency-dependent reference level, and means for varying the DC energization of the generator field winding to regulate the output of the generator to the frequency-dependent reference level. The transfer apparatus includes a circuit for producing a signal upon an excessive deviation of the output of the generator, as sensed by one of the output sensing means, from the frequency-dependent reference level of one of the reference level supplying means. Another circuit is connected to the signal producing circuit and is responsive to the signal for electrically substituting the second voltage regulator for the first voltage regulator to energize the generator field winding, whereby regulation is transferred from the first to the second voltage regulator after the excessive deviation.

In general, regulating apparatus of the invention includes transfer apparatus as above described, combined with the voltage regulators.

Generally, and in a method form of the invention, a method of operating transfer apparatus is used with an AC generator having a field winding, the DC energization of which controls the output of the generator, and with a first voltage regulator for supplying a varying excitation to regulate the output of the generator to a first reference level and a second voltage regulator for supplying a varying excitation to regulate the output of the generator to a second lower reference level, wherein the voltage regulators are connected to the field winding of the generator so that the regulator with the greater excitation energizes the field winding. The method includes the steps of producing a signal upon an excessive deviation of the output of the generator from the first reference level, and, in response to the signal, preventing the first voltage regulator from energizing the generator field winding. The second reference level is raised after the signal occurs, to cause the second voltage regulator to regulate the output of the generator to approximately the first reference level. In this way, regulation to such level is transferred from the first to the second voltage regulator.

Other objects and features will be in part apparent and in part pointed out hereinafter.

BRIEF DESCRIPTION OF THE DRAWINGS

FIG. 1 is a schematic diagram of a frequency sensing circuit for use in a transfer module of the present invention;

FIG. 2 is a waveform diagram of clock pulses and a periodic waveform of frequency divided clock pulses in the circuit of FIG. 1, the time scale of the clock pulses being magnified relative to the time scale of the frequency divided clock pulses;

FIG. 3 is a waveform diagram of a signal having a frequency to be sensed, showing zero crossing pulses produced by the circuit of FIG. 1 above a corresponding diagram of an electrical level produced by the circuit of FIG. 1;

FIG. 4 is a waveform diagram of a signal and zero crossing pulses of lower frequency than in FIG. 3, and shown above a corresponding diagram of two electrical levels produced by the circuit of FIG. 1 when the lower frequency occurs;

FIG. 5 is a waveform diagram of a signal and zero crossing pulses of still lower frequency than in FIG. 4, and shown above two corresponding diagrams of electrical levels produced at different places in the circuit of FIG. 1 at the still lower frequency;

FIG. 6 is a diagram of two selectable voltage outputs of the circuit of FIG. 1 versus a ratio of signal frequency to a rolloff frequency r;

FIG. 7 is a diagram of a system for voltage regulating a generator having an AC output which is to be frequency-dependent;

FIG. 8 is a diagram of steps in a method used in the circuit of FIG. 1;

FIG. 11 is a graph of regulator excitation versus time illustrating operation of regulating apparatus of the invention if one regulator fails off;

FIG. 12 is a graph of regulator excitation versus time illustrating operation of regulating apparatus of the invention if one regulator fails on;

Corresponding reference characters indicate corresponding parts throughout the several views of the drawings.

DESCRIPTION OF THE PREFERRED EMBODIMENTS

Figure 9:
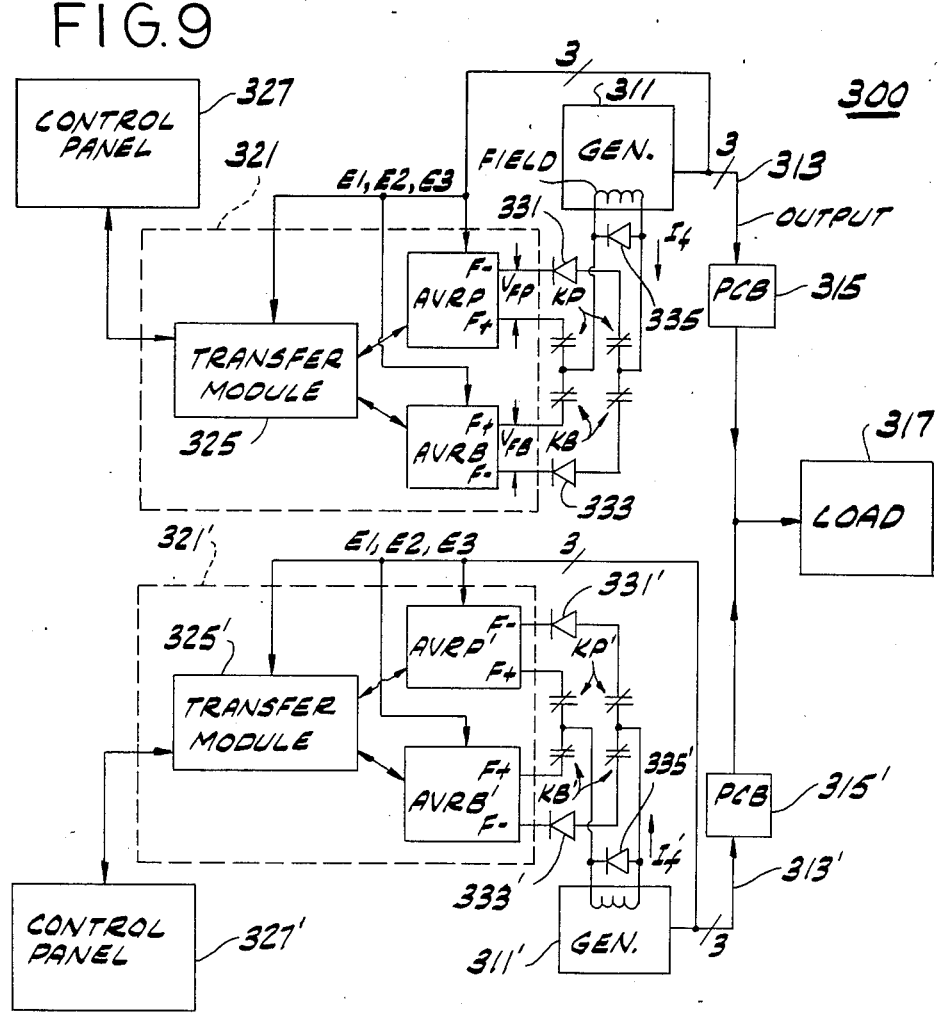
FIG. 9 is a block diagram of an electrical power system including two generators each of which has regulating apparatus of the invention that includes a transfer module of the invention.

In FIG. 1 frequency sensing circuit 11 has an oscillator 15 that produces clock pulses 17 of FIG. 2 at 1.835 MHz. on a line 21 connected to a frequency dividing circuit 23. Frequency dividing circuit 23 is composed of a D flip-flop 25 connected for divide-by-2 operation driving a 14-stage RCA CD4020A frequency divider chip 27. Frequency dividing circuit 23 thus has a value of frequency division of $2^{15}$ or 32768.

If the circuit 23 is allowed to operate freely, a square-wave periodic waveform 29 of FIG. 2 at a frequency of 56 Hz. (1,835,000 divided by 32,768) is generated at a Q14 output of frequency divider chip 27. However, a zero crossing detector 31 supplies spike shaped pulses ZC of FIG. 3 on a reset line 33. Pulses ZC are coincident with each of the zero crossings of a signal 35 the frequency of which is to be sensed. These pulses ZC restart the waveform 29 at the point marked C in FIG. 2. Therefore, the actual voltage behavior at output Q14 depends on when the pulses ZC occur relative to changes such as transitions 37, 39, 41 and 43 in waveform 29. Thus, oscillator 15 and frequency dividing circuit 23 together constitute means for commencing or initiating generation of a periodic waveform (e.g. waveform 29) in response to at least some of the zero crossings.

The frequency of the periodic waveform 29 is independent of the frequency of signal 35 and is called the rolloff frequency r herein. It is to be understood that in various embodiments the rolloff frequency is selected to be whatever value is desired for the purposes at hand, such as by changing the frequency of the oscillator 15 or the value of frequency division of frequency dividing circuit 23. If it is desired to keep rolloff frequency constant and use twice the oscillator frequency, then an extra stage of frequency division is added. Conversely, the oscillator frequency can be lowered, and stages of frequency division omitted without changing the rolloff frequency. Oscillator 15 is very stable and the rolloff frequency is readily duplicated from unit to unit of circuit 11 in manufacture. In an embodiment such as that of FIG. 1 where the oscillator 15 is not itself reset, it is preferable that the frequency division circuit 23 have a value of frequency division of at least 256 since the oscillator output on line 21 is not synchronous with reset.

A relationship of the occurrence of the zero crossings to the changes in waveform 29 in determining the voltage behavior at output Q14 is expressed by the ratio f/r of the frequency f of the signal 35 to the rolloff frequency r.

FIGS. 3, 4 and 5 show three examples of the behavior of the Q14 voltage for different frequency ratios f/r. For example, when signal 35 has a nominal AC system frequency of 60 Hz., and the rolloff frequency is 56 Hz. the ratio f/r exceeds unity as illustrated in FIG. 3. Each zero crossing pulse ZC resets frequency divider chip 27 making the voltage at Q14 go low. A transition 37 from low to high cannot occur until a time period $TL = 1/(2r)$ has elapsed after an instant C when the waveform commenced. The time period TL is half the repetition period of waveform 29 where the repetition period is the reciprocal of rolloff frequency r. Since the signal frequency f is greater than the rolloff frequency r in FIG. 3, the frequency divider chip 27 is reset upon completion of a shorter time period $T2 = 1/(2f)$.

The actual voltage at Q14 as shown in FIG. 3 is therefore a continuous low formed of a succession of initial low segments of waveform 29 commencing with point C and lasting for the time period T2. In this way, circuit 11 has means for generating pulses (e.g. on line 21) with a repetition rate selected so that the output of the frequency dividing means is an unvarying voltage during the time between successive zero crossings at the nominal frequency.

FIG. 4 shows an example when the signal frequency f is less than the rolloff frequency r but exceeds half the rolloff frequency. As in FIG. 3 each zero crossing ZC resets frequency divider chip 27 making the voltage at Q14 go low at each instant C. Transition 37 from low to high now occurs before reset and upon the time period $$TL = 1/(2r) \quad (1)$$

elapsing after each instant C. Since the signal frequency f is now less than the rolloff frequency r in FIG. 4, the frequency divider chip 27 is only reset upon completion of a longer time period $$T2' = 1/(2f). \quad (2)$$

The actual voltage at Q14 as shown in FIG. 3 is therefore a low commencing with point C and lasting for the time period TL followed by a high portion of waveform 29 which is only permitted to last for a time $TH = T2' - TL$ before reset occurs.

The proportion of time X during which the Q14 voltage is low in FIG. 4 is given by the equation $$X = TL/T2' = TL/(TL + TH) \quad (3)$$

Remarkably, substitution of the defining equations (1) and (2) into Equation (3) shows that $$X = f/r \quad (4)$$

In other words, the time proportion X is the same as the frequency ratio itself. When the rolloff frequency is constant, as in the circuit of FIG. 1, the time proportion X is a linear function of signal frequency f in FIG. 4 when f is between half the rolloff frequency and 100% of the rolloff frequency. When frequency f exceeds the rolloff frequency r, as in FIG. 3, the time proportion is always unity.

It is observed that the advantageously linear relationship of Equation (4) does not hold for the output Q14 as frequency falls below half the rolloff frequency 0.5r, as illustrated in FIG. 5. FIG. 5 shows an example when the signal frequency f is less than half the rolloff frequency, which means that a reset interval T2″ is lengthened beyond a full cycle of periodic waveform 29. This is because the Q14 voltage goes back low after transition 39 due to normal flip-flop action in the frequency divider chip 27. This would prevent the characteristic below half the rolloff frequency from being a linear extension of the characteristic above half the rolloff frequency. As in FIG. 3 each zero crossing ZC resets frequency divider chip 27 making the voltage at Q14 go low. The actual voltage at Q14 as shown in FIG. 5 is a low commencing with point C and lasting for the time period TL followed by transition 37 to the high portion of waveform 29 which is completed at transition 39 and followed by a low for a time T3=(T2″−1/r) before reset occurs.

To solve the problem of obtaining the linear relationship of Equation (4) at all frequencies below the rolloff frequency, a latch or D flip-flop 51 of FIG. 1 is provided with its clock input CL connected to output Q14 and its D input tied high to $V_{cc}$. Latch 51 produces a low in response to a zero crossing ZC pulse high because its reset pin R is connected to line 33. Upon the occurrence of low-to-high transition 37 in periodic waveform 29, latch 51 produces a Q output high 53 (FIG. 5) by latching a high from its D input to its Q output until the next zero crossing occurs. In this way, latch 51 constitutes bistable means connected to said waveform commencing means (e.g., oscillator 15 and frequency dividing circuit 23) for producing a first electrical level in response to a zero crossing and, upon the occurrence of a predetermined change in the waveform, producing a second electrical level until a subsequent zero crossing occurs. As a result, Equation (4) validly describes the output behavior at the Q output of latch 51 at *all* frequencies below the rolloff frequency because the time proportion X of latch 51 Q output low to reset time T2″ is (1/(2r))/(1/(2f)) or just f/r.

In FIG. 1 a low pass filter 61 low pass filters (effectively time-averages) the electrical levels from the latch 51 Q output to produce an output $V_f$ which is a linear function of the frequency of the signal 35. A resistor 63 is connected at one end to the Q output of latch 51 and at the other end to a capacitor 65 and another resistor 67. Capacitor 67 is connected between ground (common) and the junction of resistors 63 and 67. Resistor 67 is connected between capacitor 65 and the inverting (−) input of an operational amplifier 71. A capacitor 73 is connected between the output of amplifier 71 and its inverting input. Two resistors 75 and 77 are connected in series across capacitor 73. Capacitors 65 and 73 are of course subject to manufacturing and temperature variations but these are not critical in the low pass filter 61 and hardly affect the precise characteristics of circuit 11.

A section 81A of a shorting switch 81 is connected across resistor 77 and switch 81 has another section 81B. Two resistors 83 and 85 are connected in series between voltage $V_{cc}$ and the noninverting (+) input of amplifier 71. Switch section 81B is connected across resistor 83. Another resistor 87 and a bypass capacitor 89 are connected in parallel between the noninverting (+) input of amplifier 71 and ground. Resistor 83 (when used), and resistors 85 and 87 form a voltage divider for providing a selectable DC voltage to the noninverting input of amplifier 71. In this way amplifier 71 acts as part of the low pass filter 61 and as means for subtracting the low-pass filtered electrical levels from a predetermined voltage.

Latch 51 also constitutes means for causing the output (e.g., $V_f$ of circuit 11) for frequencies of the signal below half the waveform frequency to be different in value from the output for frequencies of the signal above half the waveform frequency. Latch 51 is also an example of means for preventing the output of the low-pass filtering means at any frequency below half the rolloff frequency from being equal in value to the output at any frequency above half the rolloff frequency.

Moreover, latch 51 is an example of means for maintaining linearity of the output of said low-pass filtering means as a function of frequency below half the rolloff frequency.

A variable resistor 93, potentiometer 95, resistor 97 and a jumper 99 are all connected in series between the output of amplifier 71 and ground. A test point 101 is connected to the junction between the variable resistor 93 and potentiometer 95. The output $V_f$ of the frequency sensing circuit 11 is taken from the wiper of potentiometer 95. Jumper 99 is ordinarily left on, but a resistor for trimming the charcteristics of potentiometer 95 is substituted for jumper 99 if desired.

The supply voltage is $V_{cc}$, and the average voltage at the latch 51 Q output is $(1-X)V_{cc}$ where (1−X) is the duty cycle, or proportion of time that the Q output is high. The average of the Q14 output is recovered by low pass filtering it with filter 61. Then the averaged output is processed to yield an output of amplifier 71 with a particular volts-per-Hertz slope.

The slope S in (per-unit) volts-per-Hertz is given by $$S=1/(1-f_1/r) \tag{5}$$

r is the rolloff frequency at which the output voltage of amplifier 71 one per-unit volts, and one-per-unit volts is arbitrarily taken to be half of $V_{cc}$ in circuit 11. $f_1$ is a lower limit frequency at which the output voltage of amplifer 71 is zero.

In FIG. 6, volts-per-Hertz characteristics 111 and 113 are shown for 1 volt-per-Hertz and for 2 volts-per-Hertz respectively. Above the rolloff frequency (above f/r=1) the output $V_f$ is at half of $V_{cc}$. Below the lower limit frequency (zero Hertz for characteristic 111, and half-rolloff for characteristic 113), the output $V_f$ is zero volts. Since the output of amplifier 71 cannot go below zero volts, it remains constant at frequencies below the lower limit frequency due to the action of latch 51. Between the rolloff frequency and the lower limit frequency, each characteristic advantageously decreases with precise linearity as a function of frequency. Because of latch 51, the characteristics do not follow lines of departure 112 and 114 as would occur if output Q14 were connected directly to low pass filter 61 in FIG. 1.

The resistances of resistors 63, 67, 75 and 77 are all made equal to each other. The resistances of resistors 83 and 87 are made equal to each other and the resistance of resistor 85 is twice the resistance of resistor 87. Then when switch sections 81A and 81B are open, the 2 volts-per-Hertz characteristic 113 is obtained. When switch sections 81A and 81B are closed, the 1 volt-per-Hertz characteristic 111 is obtained. Thus switch 81 constitutes means for selecting a volts per Hertz slope of the output of the low-pass filtering means relative to the frequency of the signal. Alternatively, resistors 77 and 83 can be made ganged variable resistors and the switch 81 omitted.

When several frequency sensing circuits 11 are used variable resistor 93 in each of the circuits 11 is adjusted until the voltage at test point 101 is exactly the same in each of the circuits 11, or in voltage regulator applications until equal generator voltages are produced. Potentiometer 95 in each frequency sensing circuit is ganged with the corresponding potentiometer 95 in the other circuits 11. Then the voltage output $V_f$ from the wiper of potentiometer 95 tracks in all of the units. The wiper of potentiometer 95 is adjusted to provide a desired level of voltage output 121 (FIG. 6) at and above the rolloff frequency.

The construction and operation of circuit 11 of FIG. 1 is now further discussed. Oscillator 15 has an inverter 131, the output of which is connected to the input of a second inverter 133. The output of inverter 133 is connected to line 21 to the clock input of flip-flop 25. A 1.835 MHz. quartz crystal is connected in series with a resistor 137 between the input and the output of inverter 131. (A circuit with a ceramic resonator can also be used to obtain a high degree of frequency stability.) A resistor 139 is also connected between the input and the output of inverter 131. Two capacitors 141 and 143 are respectively connected from each terminal of crystal 135 to ground. A capacitor 145 is connected between $V_{cc}$ and ground to prevent transients and ripple on the supply voltage $V_{cc}$ line 147. D flip-flop 25 has its set and reset inputs S and R tied to ground and its Q-bar output connected to its D input. The Q output of D flip-flop 25 is connected to the clock CL input of frequency divider chip 27.

In zero crossing detector 31, signal 35 is coupled through a low pass filter 151 composed of two resistors 153 and 155 and a capacitor 157. Resistors 153 and 155 are connected in series between an input terminal 159 for signal 35 and an inverting (−) input of an operational amplifier 161. The noninverting (+) input of amplifier 161 is connected to ground. Two diodes 163 and 165 are connected in parallel and with polarities reversed across the inputs of amplifier 161. In this way, the output of amplifier is a square wave that is high when signal 35 is negative and low when signal 35 is positive.

The output of amplifier 161 is connected to the gate of each of two field effect transistors (FETs) 171 and 173 on a CD4007A COS MOS chip that also has two more FETs 175 and 177. FETs 171 and 175 are p type and FETs 173 and 177 are n type enhancement FETs. The source and substrate of FET 171 are connected with the substrate of FET 175 to supply voltage $V_{cc}$. The sources and substrates of FETs 173 and 177 are connected together and to ground. The drains of FETs 171 and 173 are connected together and to each gate of FETs 175 and 177. The drains of FETs 175 and 177 are connected to each other.

A PNP transistor 181 has its emitter connected to $V_{cc}$, its base connected to the source of FET 175, and collector connected to reset line 33. A resistor 183 is connected between the emitter and base of transistor 181, and a resistor 185 is connected between the collector of transistor 181 and ground. FETs 171 and 173 acting together produce an output on a line 187 which is a new square wave that has a rise and fall time hundreds of times faster than that generated by amplifier 161. This improved square wave is in turn supplied to the gates of FETs 175 and 177 which have an advantageous feature such that during the rise and fall times of the input to their gates, a substantial "fire through" current flows through them between $V_{cc}$ and ground (common) for a few microseconds. Since the source of the FET 175 is connected to the base of transistor 181, the fire through current momentarily causes conduction by transistor 181 and generates a very sharp pulse across resistor 185 which is ideal for resetting frequency divider chip 27 and latch 51.

In FIG. 7 an electrical power generating system 200 includes a generator 201 for supplying a three-phase AC output voltage to a load 203 having transformers and motors on a set of lines 205, 207, and 209. The voltages between the lines or phases are approximately equal in magnitude and 120° out of phase at a nominal system frequency of 60 Hertz. For the present purposes the root-mean-square (r.m.s.) value of line-to-line voltage is regarded as representative of the AC output voltage of generator.

The frequency sensing circuit 11 acts as an underfrequency rolloff circuit supplying a reference voltage $V_f$ to a voltage regulator 211. Regulator 211 is connected to the lines 205, 207 and 209 to obtain operating power and also to sense the voltage therefrom. Regulator 211 provides a DC current $I_f$ to a field winding 213 of generator 201, and regulates the generator output voltage using voltage $V_f$ from circuit 11 as a reference. The circuitry of regulator 211 includes an error detector for comparing the reference voltage $V_f$ with the sensed voltage from the generator 201, an error amplifier, a power controller and a stabilization network. A variable regulating voltage produced by the power controller is typically a series of pulses which are varied in width to adjust the DC field current.

In FIG. 7 a potential transformer 221 is connected between two of the lines 205 and 207 and has a secondary winding connected between input terminal 159 of circuit 11 and ground. A rolloff frequency (e.g. 56 Hz.) is established in circuit 11 of FIG. 1 slightly below a nominal system frequency $f_n$ of 60 Hz., see FIG. 6. Below the rolloff frequency, the reference voltage $V_f$ decreases linearly at a volts-per-Hertz rate selected by switch 81.

A method of operation of the circuit 11 of FIG. 1 is diagrammed in FIG. 8. A first method step 251 is an operation of commencing generation of periodic waveform 29 of FIG. 2 in response to at least some of the zero crossings of signal 35. A next method step 253 is an operation of producing a first electrical level in response to a zero crossing and, upon the occurrence of a predetermined change in the waveform, producing a second electrical level until a subsequent zero crossing occurs. A final step 255 is an operation of low-pass filtering the electrical levels to produce an output which is a function of the frequency of the signal.

In some embodiments of the invention it is contemplated that the frequency sensing circuit 11 of FIG. 1 is used as a frequency measuring instrument by connecting a voltmeter 271 to the voltage $V_f$. The rolloff frequency of circuit 11 is established above a frequency of the signal 35 to be measured so that its f/r ratio 273 lies below 1.0 in FIG. 6 and in the linear range of the instrument. It is to be understood that in some embodiments the rolloff frequency will not be anywhere near 60 Hertz. and that the rolloff frequency can be made variable for various purposes.

In FIG. 9 an electric power system 300 has generators 311 and 311' providing a three-phase AC output on lines 313 and 313' to power circuit breaker (PCB) 315 and 315' respectively. PCBs 315 and 315' are connected in parallel to a load 317. Relays of conventional type for controlling the PCBs are not shown for clarity in FIG. 9 as they are outside the scope of the present work. Each generator 311 and 311' has a field winding the current $I_f$ in which is regulated by identical units of inventive regulating apparatus 321 and 321' in order to control the output of each generator 311 and 311' respectively. Only the regulating apparatus 321 is presently described since the identical regulating apparatus 321' has corresponding parts marked with primes to which corresponding description applies.

In regulating apparatus 321, an inventive transfer apparatus, or module, 325 monitors and controls two automatic voltage regulators AVRP and AVRB (P for "prime" and B for "backup"). The three phases E1, E2 and E3 from the output 313 of generator 311 are connected to transfer module 325, AVRP and AVRB for voltage sensing and power supply purposes. ("3/" indicates 3 phases represented by one line on the drawing.) A control panel 327 for transfer module 325 provides control and display functions for the user.

Voltage regulators AVRP and AVRB each have output terminals F+ and F− which are connected to the field winding of generator 311 so that the first voltage regulator AVRP ordinarily energizes the field winding, and in general the regulator with the greater excitation at any instant energizes the field winding. This is accomplished by blocking diodes 331 and 333 having their cathodes respectively connected to the F− terminal of regulator AVRP and the F− terminal of AVRB. If regulator AVRP is providing more excitation (or voltage) at any instant than regulator AVRB, then diode 331 is forward biased (conductive) and diode 333 is reverse biased (nonconductive), and regulator AVRP supplies power to the field winding. Regulators AVRP and AVRB illustratively produce voltage pulses of varying duty cycle for the field winding. Each regulator has an internally supplied frequency dependent electrical reference level to which it regulates the generator output. This reference level can be automatically raised or lowered by a predetermined percentage to a level such as 100% or 91% by transfer module 325.

A freewheeling diode 335 is connected across the field winding so as to be reverse biased when power is applied to the field from either regulator AVRP or AVRB. Normally closed contacts of a trip relay KP are provided in both lines to the field winding from regulator AVRP. One of the contacts of relay KP is connected between the anode of diode 331 and the line to the field winding connecting to the anode of freewheeling diode 335. When relay KP is tripped, regulator AVRP is electrically isolated from the field winding. Regulator AVRB is similarly connected so that normally closed contacts of another trip relay KB are provided in both lines to the field winding from regulator AVRB. One of the contacts of relay KB is connected between the anode of diode 333 and the line to the field winding connecting to the anode of freewheeling diode 335. When relay KB is tripped, regulator AVRB is electrically isolated from the field winding.

Figure 10:
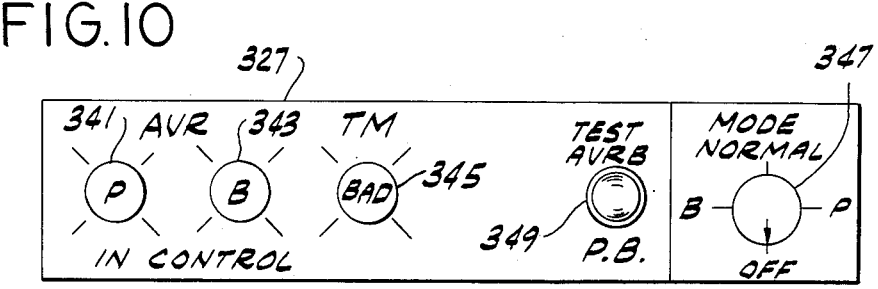
FIG. 10 is a pictorial illustration of a control panel for a transfer module of FIG. 9.

In FIG. 10 control panel 327 for transfer module 325 has a pair of display lamps 341 and 343 which respectively indicate that automatic voltage regulator AVRP or AVRB is in control, i.e. energizing the field winding. Another display lamp 345 is illuminated if circuits in transfer module 325 detect a malfunction in the sensing of the transfer module itself.

A mode switch 347 causes the transfer module 325 to operate in four selectable modes as follows:

In the OFF position there is no excitation from regulators AVRP and AVRB because a section S of mode switch contacts (not shown in FIG. 9) disconnects all sources of power from the transfer module 325 and from the regulators AVRP and AVRB and also disconnects the field winding from the regulating apparatus 321.

In the PRIME (P) mode only the first regulator AVRP is connected to the field winding and second regulator AVRB is disconnected because of the section S of mode switch contacts. The regulation level on the prime regulator AVRP is set to 100%. The transfer module 325 disconnects the prime regulator AVRP from the field winding upon either the occurrence of an overvoltage or overexcitation condition. The transfer module 325 does not operate in this mode to reconnect the backup regulator AVRB if relay KP trips. The PRIME mode is useful when maintaining or removing the backup regulator AVRB.

In the BACKUP (B) mode only the second regulator AVRB is connected to the field winding, and the first regulator AVRP is disconnected, because of the section S of mode switch contacts. The regulation level on the second regulator AVRB is set to 100%. The transfer module 325 disconnects the regulator AVRB from the field winding upon either the occurrence of an overvoltage or overexcitation condition. The transfer module 325 does not operate in this mode to reconnect the prime regulator AVRP when relay KB trips. The BACKUP mode is useful when maintaining or removing the prime regulator AVRP.

In the NORMAL (N) mode, both the prime and backup regulators AVRP and AVRB are connected to the field winding because the normally closed contacts of both the KP and KB relays are closed. The regulation level on the first regulator AVRP is set to 100% and that on the second regulator AVRB is set to a lower level such as 91%. Consequently, the regulator AVRP is ordinarily in control as prime regulator. However, the transfer module 325 can disconnect the prime regulator AVRP from the field winding by tripping the KP relay not only upon the occurrence of an overvoltage or overexcitation condition but also other conditions indicative of loss of regulation such as by failure on or failure off. The second regulator AVRB then automatically provides regulation because the KB relay contacts are still closed and diode 333 conducts. The transfer module 325 at this time operates in the NORMAL mode to raise the regulation level of the second regulator AVRB from 91% to 100%. The NORMAL mode thus provides normal operation of the first regulator AVRP, which acts as prime regulator, with backup by the second regulator AVRB. When regulator AVRB has to be used, there is no loss of generator output because the reference level for regulator AVRB is raised to 100% at such time.

In the NORMAL mode, there is no frequency relaying by the transfer module 325 in the sense of disconnection of a generator or regulator when frequency falls below a predetermined level. Instead, the regulator which is in control, normally the first regulator AVRP, simply continues to regulate the generator output to the frequency-dependent reference from the circuit 11 (FIG. 1) therein as that reference falls with frequency of the generator. The functions of the transfer apparatus 325 are also maintained over a wide range of generator frequencies.

In the NORMAL mode, a pushbutton (P.B.) switch 349 of FIG. 10 marked TEST AVRB, can be pressed to cause a circuit in transfer module 325 to reverse the roles of the first and second regulators AVRP and AVRB so that regulator AVRP acts as a backup for regulator AVRB. This is accomplished by interchanging the reference levels so that regulator AVRB is set to 100% and regulator AVRB is set to 91%. (Pushbutton switch 349 can of course be replaced by a toggle switch if longer than momentary interchanging of the regulators is desired.)

FIG. 11 illustrates operations of transfer module 325 upon failure-off of regulator AVRP as prime regulator. In condition 361, normal operation with AVRP on as prime (P) has AVRP regulating to 100% level of excitation through diode 331 of FIG. 9. Regulator AVRB has its electrical reference set to 91%, and because AVRP is keeping generator 311 output above 91%, regulator AVRB produces negligible excitation (B OFF).

In condition 363, regulator AVRP fails off, which means that its excitation falls to zero as indicated by arrow 364. The excitation of regulator AVRP is now insufficient to keep the generator 311 output above the 91% of reference level, and regulator AVRB turns on through its diode 333 and temporarily regulates generator 311 so that the 91% level is maintained. At this time transfer module 325 senses that regulator AVRP has failed off.

Condition 365 shows that transfer module 325 has taken corrective action to raise the reference level for regulator AVRB to 100%, to which the generator output is regulated. Relay KP is tripped so that regulator AVRP can be removed and replaced.

FIG. 12 illustrates operations of transfer module 325 if there is a failure-on of regulator AVRP as prime regulator. Condition 371 is identical to condition 361 of normal operation in FIG. 11. Regulator AVRP is on and AVRB is off.

In a condition 373 of FIG. 12, regulator AVRP fails on, which means that its excitation is inappropriately high and generator output rises above 100% of reference level, as indicated by arrow 374. At this time transfer module 325 senses that regulator AVRP has failed on. Regulator AVRB is still off.

In condition 375 transfer module 325 has taken corrective action to trip relay KP so that regulator AVRP can be removed and replaced. The reference level for regulator AVRB raised to 100%, to which the generator output is regulated. Regulator AVRB is on and AVRP is off.

Next discussed is an inventive method of detection of a faulty automatic voltage regulator in a multigenerator system with redundant voltage regulators as in FIG. 9.

According to this method, a voltage regulator compares the vector sum of two voltages to a reference voltage $V_f$ (also designated R herein) from circuit 11 of FIG. 1. The two voltages are the generator voltage V and a voltage I representing generator output current. When controlling a generator not connected to a load, the regulator supplies whatever excitation is necessary to an exciter field or a main generator field winding to maintain a constant ratio between the generator voltage V and the reference voltage R. Furthermore, the regulator, if it is not supplied a current signal I (I=0 at no load) will increase its excitation as required to maintain this ratio for a variety of loads connected to the generator.

When a current signal representing generator output current is supplied to the regulator, the regulator maintains at a constant amplitude the vector sum of the two voltages, or V+I. Appropriate phases of generator voltage and current are selected so that for an inductive load, these signals are in phase. Adding the I term tends to increase the amplitude of V+I. This causes the regulator to decrease its output, decreasing both V and I until the amplitude of their sum is the same as V alone in the unloaded case.

For a resistive load, the current signal I leads the voltage signal V by 90 electrical degrees owing to the phase selection described above. The presence or absence of this resistive current signal I has only a minor effect on the V+I amplitude. Also owing to the phase selection, a capacitive load produces a current signal 180 degrees out of phase with V so that V+I is smaller than V alone.

During parallel operation of the generator 311 with another AC power source, such as generator 311', the voltage regulator again keeps V+I constant. Again, I is the current flowing out of the generator 311. If the external source voltage V decreases, the voltage regulator responds by increasing excitation until the in-phase component of I increases to restore V+I to the normal value.

Various defects in a voltage regulator can cause its output to the field winding of its associated generator to be greater or less than it should be, resulting in increase or decrease of V+I from its normal level. A deviation of V+I from its normal level therefore is considered to be one of the signs of a defective regulator. It should be recognized that deviations in V+I may occur because requirements on the voltage regulator are beyond its capabilities. Examples of this are: under-frequency operation, diode failure in a brushless exciter, insufficient power input for the power amplifier of the regulator, overload of generator, etc.

A principal configuration of system elements is analyzed for symptoms that indicate a regulator failure:

The generator 311 is connected to a bus that may be connected to a number of other generator sets. The generator is equipped with two voltage regulators AVRP and AVRB selectable according to the modes of mode switch 347 of FIG. 10.

In this configuration each regulator preferably utilizes a paralleling compensation signal representing the generator output current I and derived by a current transformer (CT) associated with the generator. Therefore, the regulator responds to I as well as output voltage V. Variation of the voltage regulator adjustment potentiometer 95 of FIG. 1 in the direction of increasing voltage R tends to cause the amplitude of V+I to increase. However, if the bus voltage V is constant, variation of reference voltage R controls the amplitude of I, which is the lagging power factor output current of the generator 311. Turning the potentiometer in the direction of decreasing reference voltage causes progressively less lagging or increasing leading power factor current output to flow.

The magnitude of the vector sum V+I must remain constant, or equal to reference R, in a properly operating regulator. Consequently, if output voltage V decreases, the regulator increases its output making the lagging component of current I increase. Conversely, if output voltage V increases, the regulator decreases its output causing the lagging component of generator output current I to decrease or the leading component to increase. This phenomenon makes it possible to adjust the regulator so that the generator delivers a desired level of reactive current to the bus assuming bus voltage remains constant. It also makes possible operation of a number of generators on the same bus which share the reactive component of the load.

If regulators for all the generators on the bus are receiving individual parallel compensation signals I from respective current transformers, then when the load on the bus is inductive, the voltage of all generators will droop. This undesirable effect can be eliminated by adding wires to connect all the current transformers on the bus in series in a large loop, plus to minus, plus to minus, plus to minus, etc. so as to produce a current difference signal. Now the compensation signal provided to any one regulator represents the difference between the current from the associated generator and the average of all the other generators' currents. Each regulator uses the reactive component of this difference signal to make all of the generators on the bus share reactive load proportionally. The voltage on the bus does not droop for inductive loads in this reactive differential compensation scheme.

In the present work the "output" of a generator is represented by its voltage or by some function of its voltage and current according to current compensation, or differential compensation or any other appropriate scheme. An excessive deviation $V+I$ from the reference level R is regarded as a sign of a bad regulator, and the cure is to switch to a standby regulator. If the deviation of $V+I$ is still excessive, system requirements may be beyond the capability of either voltage regulator. If there is prolonged excessive excitation beyond a time delay built into an overexcitation detector in the regulator, corrective action is taken to avoid overheating the generator.

If $V+I$ excessively deviates above R of the primary regulator and the output voltage of the primary regulator is greater than that of the backup regulator, then the primary regulator is regarded as defective. The primary regulator is disabled and the backup regulator is substituted.

If $V+I$ excessively deviates above R of the primary regulator and the output voltage of the backup regulator is greater, then the backup regulator is defective and is tripped out of the system.

If $V+I$ excessively deviates below R of the primary regulator, and the output voltage of the backup regulator is greater than that of the primary regulator and pushbutton 349 of FIG. 10 is not pressed, then the primary regulator has failed off and is tripped out of the system.

In the preferred embodiment a difference $R-(V+I)$ is electronically analyzed to determine if it excessively deviates high or low from zero. Excessive deviation is considered to be a sign of a malfunctioning regulator and a comparison of the excitation voltage of regulators AVRP and AVRB is utilized to determine which regulator is defective. Also, if the FIG. 9 generator 311 field winding becomes disconnected from the regulating apparatus 321, or if the lines to the field winding become shorted, $R-(V+I)$ departs from zero because of the effect on generator output $V+I$ due to lack of field winding excitation. If the generator voltage does not fall because it is connected to a second generator or to a utility bus, $R-(V+I)$ still departs from zero because of an increase in magnitude of current I due to a rise in circulating current resulting from the lack of field winding excitation.

Logic Table I nonexhaustively summarizes various symptoms to be detected and corrective action to be taken.

LOGIC TABLE I

| Conditions for Prime AVR Trip | Conditions for Backup AVR Trip |
|---|---|
| 1. V+I High, sensed by AVRP & | 1. V+I High, sensed by AVRB. & |
| 2. Excitation from AVRP greater than from AVRB & | 2. Excitation from AVRB greater than from AVRP. & |
| 3. Not the case that both AVRP and AVRB are forcing & | 3. Not the case that both AVRP and AVRB are forcing. & |
| 4. Not the case that both AVRP and AVRB are off. OR | 4. Not the case that both AVRP and AVRB are off. OR |
| 1. V+I Low, sensed by AVRP & | 1. V+I Low, sensed by AVRB & |
| 2. Excitation from AVRB greater than from AVRP & | 2. Excitation from AVRP greater than from AVRB. & |
| 3. Not the case that both AVRP and AVRB are forcing & | 3. Not the case that both AVRP and AVRB are forcing. & |
| 4. Not the case that both AVRP and AVRB are off. & | 4. Not the case that both AVRP and AVRB are off. & |
| 5. P.B. 349 not pressed. OR | 5. P.B. 349 pressed. OR |
| 1. 1 minute of overexcit'n (Sense combined output of both regulators) & | 1. 1 minute of overexcit'n (Sense combined output of both regulators) & |
| 2. Excitation from AVRP greater than from AVRB & | 2. Excitation from AVRB greater than from AVRP. & |
| 3. Not the case that both AVRP and AVRB are forcing & | 3. Not the case that both AVRP and AVRB are forcing. & |
| 4. Not the case that both AVRP and AVRB are off. OR | 4. Not the case that both AVRP and AVRB are off. OR |
| 1. Overvoltage sensed by regulator AVRP & | 1. Overvoltage sensed by regulator AVRB & |
| 2. Excitation from AVRP greater than from AVRB & | 2. Excitation from AVRB greater than from AVRP. & |
| 3. Not the case that both AVRP and AVRB are forcing & | 3. Not the case that both AVRP and AVRB are forcing & |
| 4. Not the case that both AVRP and AVRB are off. OR | 4. Not the case that both AVRP and AVRB are off. OR |
| 1. PRIME SENSING BAD OR | 1. BACKUP SENSING BAD OR |
| 1. Prime Missing Phase | 1. Backup Missing Phase |

Figure 13:
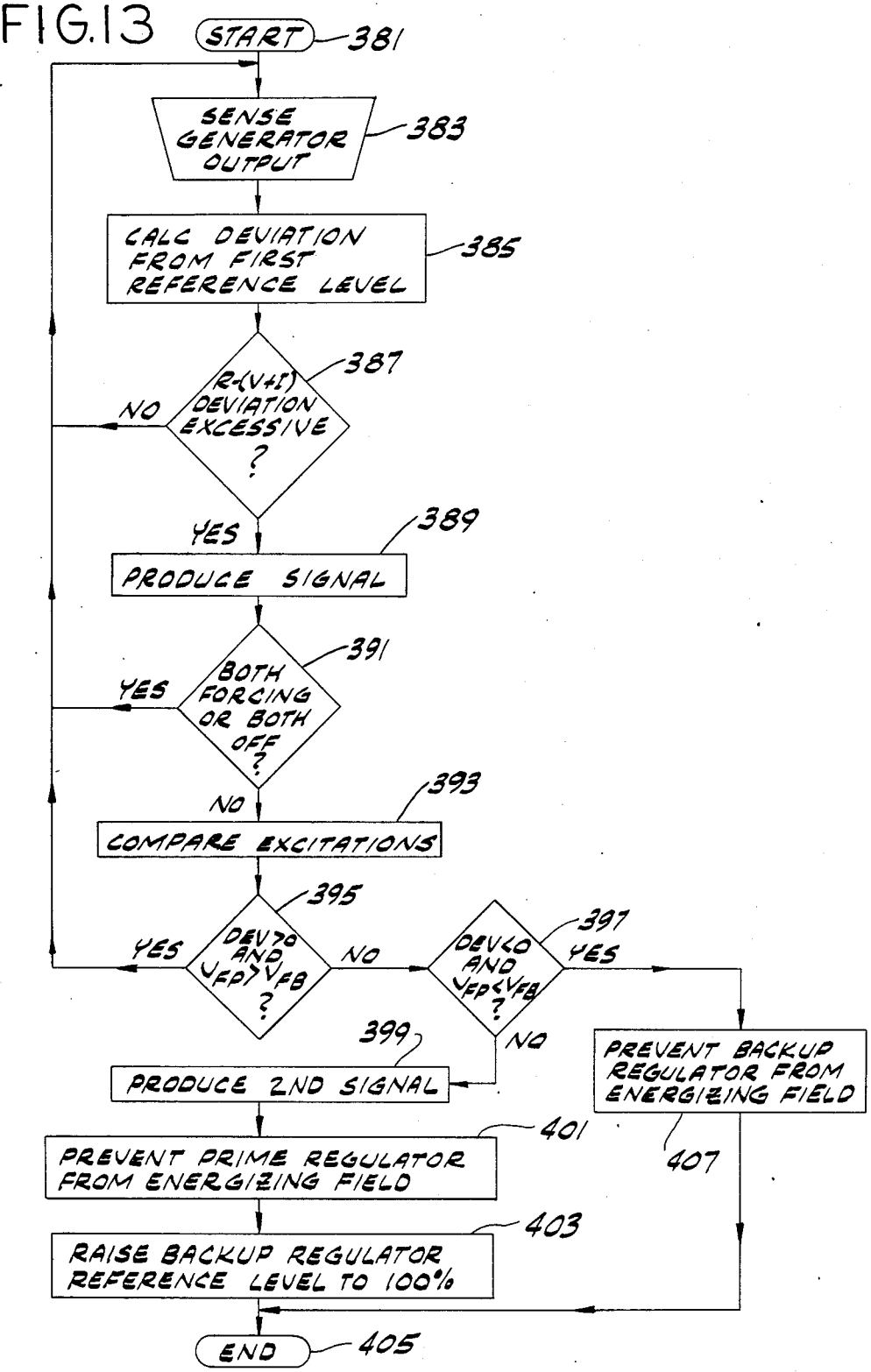
FIG. 13 is a diagram of a method of the invention for operating a transfer module of FIG. 9.

In FIG. 13, operations according to an inventive method commence with START 381 and proceed to a step 383 to sense the generator output by deriving the magnitude of the vector sum $V+I$ of output voltage V and output current I (or other compensation signal). Next in a step 385 the quantity $R-(V+I)$ is calculated to determine the deviation of the generator output $V+I$ from electrical reference R. The deviation $R-(V+I)$ is positive if the generator output is low, and the deviation is negative if the generator output is high. Operations proceed to a decision step 387 where the quantity $R-(V+I)$ is checked for excessive deviation from zero, and if the generator output is effectively regulated there is no excessive deviation and operations branch back to step 383.

On the other hand, if $R-(V+I)$ exceeds a predetermined positive value, the generator output is too low and the generator output is not being effectively regulated to the reference level R which is the 100% level for the first regulator AVRP, for example. If $R-(V+I)$ is less than a predetermined negative value, the generator output is too high and the generator output is also not being effectively regulated to the reference level R. In either case, the deviation is excessive and operations proceed to a step 389 to produce at least one signal indicating that regulation has been lost and whether the deviation $R-(V+I)$ is too high or too low.

Next, in a step 391 the excitations, or output voltage levels $V_{FP}$ and $V_{FB}$, of regulators AVRP and AVRB are checked to detect whether the regulators are both supplying more than a predetermined high level of excitation (both forcing) or less than a predetermined low level of excitation (both off). In either case, the conclusion follows that the loss of regulation is due to causes external to the regulating apparatus 321 because it is unlikely that both regulators would fail simultaneously in a like manner. Consequently, a branch is made from step 391 back to step 383 if both regulators are forcing or both are off. Otherwise, operations proceed to step 393 to compare the excitations $V_{FP}$ and $V_{FB}$ produced by the regulators AVRP and AVRB, whence a decision step 395 is reached.

A branch is made from step 395 back to step 383 if the deviation $R-(V+I)$ is excessively high (generator output low) and excitation $V_{FP}$ is greater than $V_{FB}$. This is because regulator AVRP is exciting the field but the generator output is low anyway, presumably due to some other cause than a malfunction in AVRP. If the test of step 395 is not met, operations proceed to another decision step 397 to determine whether deviation $R-(V+I)$ is excessively low (generator output high) and excitation $V_{FP}$ is less than $V_{FB}$.

If the tests of steps 395 and 397 are both not met, regulator AVRP has almost certainly failed and operations proceed to a step 399. This is because (A) generator output is low and regulator AVRP has failed off or (B) generator output is high and regulator AVRP has failed on. In step 399 a second signal is produced to command a transfer from regulator AVRP to regulator AVRB. The transfer, or substitution, is accomplished by two steps 401 and 403. In step 401 the prime regulator is disabled and/or tripped out, or otherwise prevented from energizing the field winding. In step 403, the second reference level is raised after the second signal occurs, to cause the voltage regulator AVRB to regulate the output of the generator 311 to approximately the first reference level of 100%. In this way, regulation to the 100% level is transferred from the first regulator AVRP to the second regulator AVRB. Operations then terminate at END 405.

If at step 397 the deviation $R-(V+I)$ is excessively low (generator output high) and excitation $V_{FP}$ is less than $V_{FB}$, regulator AVRP is not exciting the field and regulator AVRB has failed on and should be tripped. In such case, operations branch to a step 407 in which the KB relay is tripped to prevent regulator AVRB from energizing the field, whence END 405 is reached.

It is noted that steps 393 to 399 are regarded as comparing the excitation from the first voltage regulator to the excitation from the second voltage regulator and supplying a second signal when the excitation from the first voltage regulator is greater than the excitation from the second voltage regulator and the generator output deviates above the reference level, and delaying the preventing step until the second signal is present. Also, steps 393 to 399 compare the excitation from the first voltage regulator to the excitation from the second voltage regulator and supply the second signal when the excitation from the first voltage regulator is less than the excitation from the second voltage regulator and the generator output deviates below the reference level, and the preventing step is delayed until the second signal is present.

It is emphasized that the operations of the method are suitably implemented either in hardware or in a digital computer system programmed in accordance with the flow diagram of FIG. 13.

Figure 14:
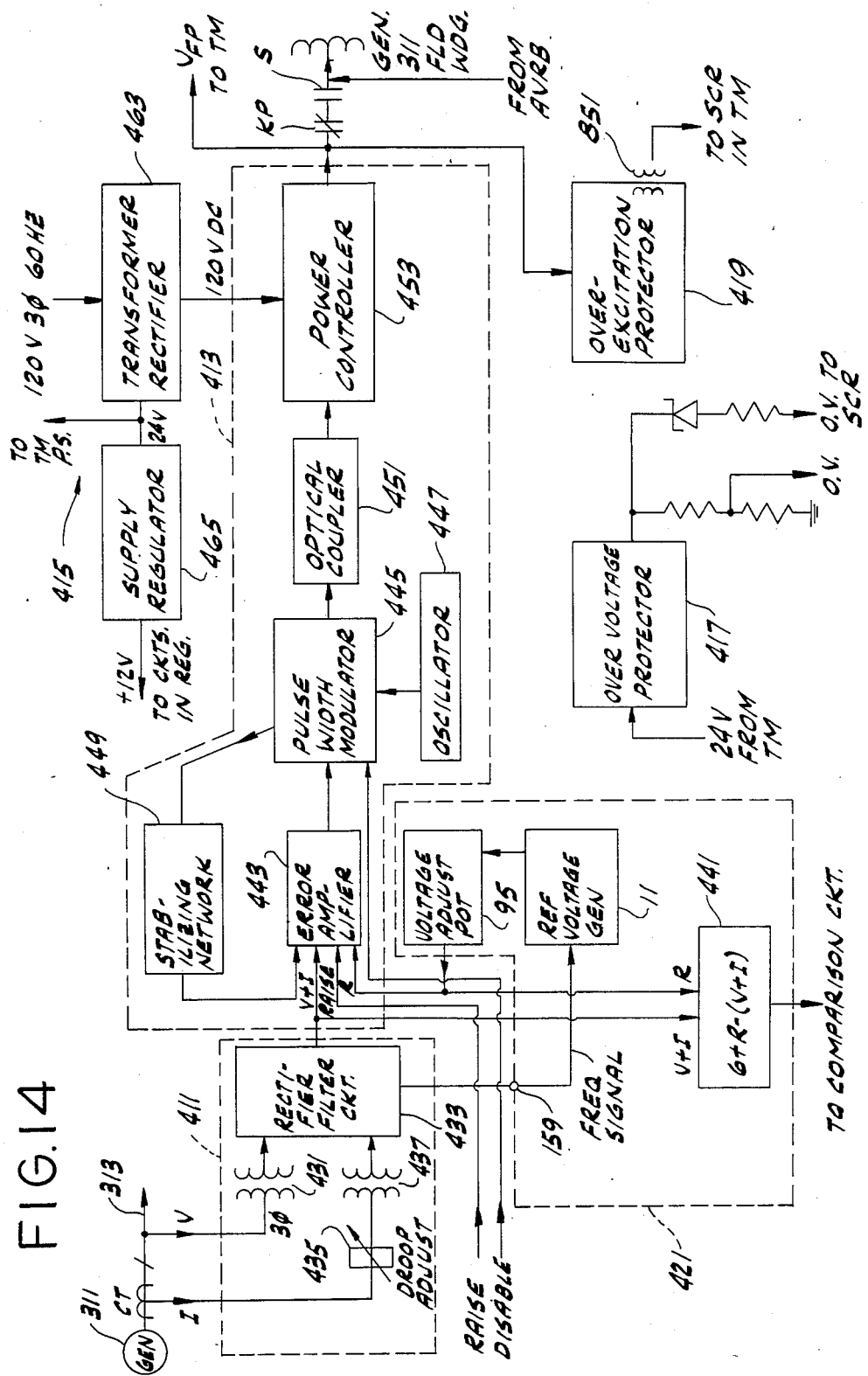
FIG. 14 is a block diagram of one of the identical voltage regulators in regulating apparatus of FIG. 9 as well as a block diagram of some of the associated transfer module circuitry for controlling and monitoring the voltage regulator.

FIG. 14 shows a block diagram of first voltage regulator AVRP of FIG. 9 which includes a generator output sensing circuit 411, an energization varying circuit 413, a power supply 415, an overvoltage protector circuit 417 and an overexcitation protector circuit 419. Generator 311 output line 313 is coupled to the sensing circuit 313 by three-phase connections providing output voltage V and through a current transformer CT providing output current I. Sensing circuit 411 produces an electrical voltage herein called $V+I$ which is actually proportional to the magnitude of the vector sum of the output voltage V and output current I as discussed in greater detail hereinabove. Associated with regulator AVRP is a signal circuit 421 of the transfer module 325 of FIG. 9 which generates a first signal $[6+R-(V+I)]_P$. (The 6 volt offset of $R-(V+I)$ simplifies comparison circuitry elsewhere in the transfer module which has a single-ended power supply.)

Second voltage regulator AVRB of FIG. 9 has a block diagram which is identical to that shown for regulator AVRP in FIG. 14, and the block diagram of regulator AVRB is omitted for brevity. Associated with regulator AVRB is a second signal generating circuit for producing a signal $[6+R-(V+I)]_B$, which second circuit is identical to circuit 421 of FIG. 14.

In the block diagram of FIG. 14, sensing circuit 411 includes a three-phase transformer 431 for supplying voltage V to a rectifier-filter circuit 433. A droop-adjust variable resistor 435 and current transformer 437 supply a voltage representing current I to rectifier-filter circuit 433. Rectifier-filter circuit 433 supplies a frequency signal on a line 159 to a reference voltage generating circuit 11 (same circuit as in FIG. 1). Circuit 11 is connected to the voltage adjust potentiometer 95 as in FIG. 1, and the wiper of potentiometer 95 supplies frequency-dependent reference voltage $V_f$, which is also identified with the symbol R. Reference voltage R from potentiometer 95 and sensed generator output $V+I$ from circuit 433 are both connected to a differencing amplifier 441 for generating $6+R-(V+I)$. Also, reference voltage R from potentiometer 95 is supplied to an error amplifier 443 which also has inputs for sensed generator output $V+I$ and for a RAISE signal that raises or lowers the reference voltage R seen by error amplifier 443 by a predetermined percentage. Energization varying circuit 413 constitutes means for varying the DC energization of the generator field winding to regulate the output of the generator to a respective reference level for the voltage regulator AVRP. To this end, the error amplifier 443 controls a pulse width modulator 445 that is also fed by an oscillator 447. Feedback from pulse width modulator 445 is supplied to an additional input of error amplifier 443 through a stabilizing network 449.

The pulse width modulated output of modulator 445 is coupled through an optical coupler 451 for voltage isolation to a power controller 453 which provides an excitation $V_{FP}$ through relay contacts KP and section S of the mode switch to the field winding of generator 311. The output of the power controller 453 is also connected to circuits in the transfer module 325, and to overexcitation protector circuit 419. The generator field winding is also supplied from voltage regulator AVRB, and the singleline representation of connections to the field winding is suggestive of the more detailed diagram of these connections in FIG. 9.

In power supply 415 three phase 120 volt 60 Hz. power is supplied to a full-wave transformer-rectifier circuit 463. Circuit 463 supplies 120 volts DC to power controller 453, and also supplies 24 volts positive to the transfer module 325 and to a DC supply regulator circuit 465. Supply regulator circuit 465 provides 12 volts positive to the electronic circuits in voltage regulator AVRP.

Figure 15:
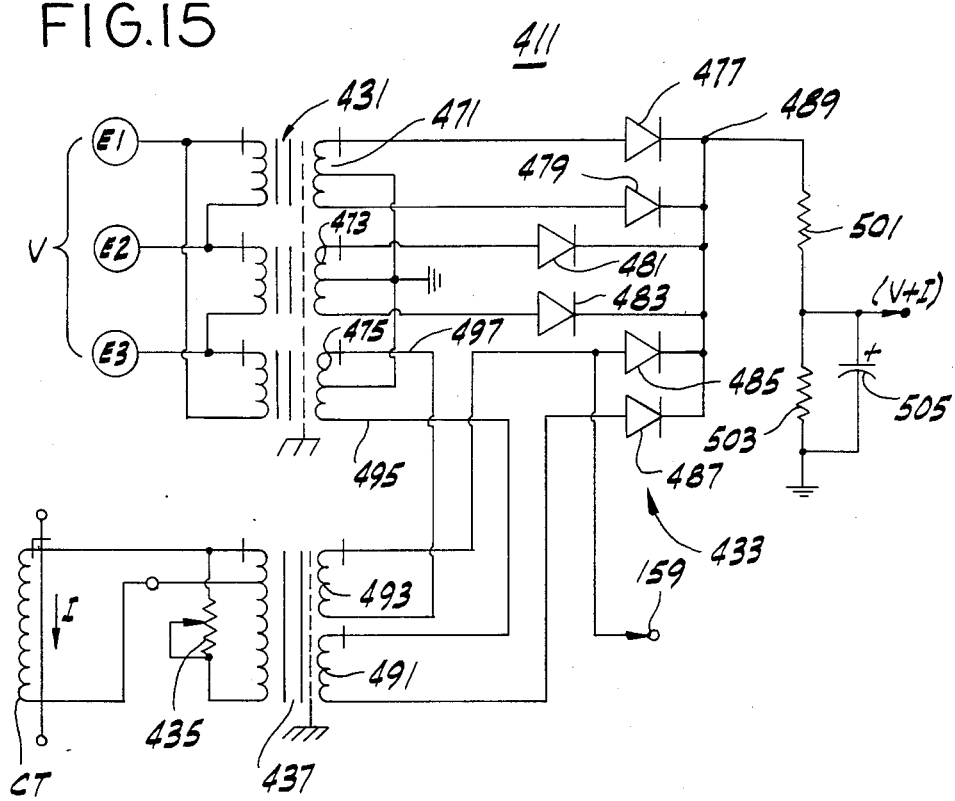
FIG. 15 is a schematic diagram of a circuit for sensing generator output, which circuit is replicated in each voltage regulator and transfer module of FIG. 9.

In FIG. 15 a schematic of sensing circuit 411 shows generator 311 output voltage V connected through three lines E1, E2 and E3 to a delta-connected primary of transformer assembly 431. Transformer assembly 431 has three center-tapped secondary windings 471, 473 and 475, and the center-tap connections are connected to a circuit common for the regulators and the transfer module. Six diodes 477, 479, 481, 483, 485 and 487 are connected at their cathodes to a common point 489. The anodes of diodes 477 and 479 are connected across winding 471, and the anodes of diodes 481 and 483 are connected across winding 473, as full wave rectifiers.

Generator output current I on one of the output lines from generator 311 energizes current transformer CT. The output voltage of current transformer CT is connected across part of a primary winding of transformer 437. Droop-adjust variable resistor 435 is connected across the whole primary of transformer 437. Transformer 437 has two secondary windings 491 and 493. Secondary winding 491 is connected between a first terminal 495 of winding 475 and the anode of diode 487. Secondary winding 493 is connected (with opposite polarity compared to winding 491) between a second terminal 497 of winding 475 and the anode of diode 485. The anode of diode 485 is also connected to input terminal 159 of circuit 11 of FIGS. 1 and 14. In this way, a vector sum of voltage and current is supplied in a balanced manner to the anodes of full wave rectifying diodes 485 and 487. A voltage divider comprised of two resistors 501 and 503 is connected between point 489 and common. A filter capacitor 505 is connected across resistor 503. The rectifying action of the diodes and the filtering action of the voltage divider and capacitor 505 derives a voltage magnitude designated V+I proportional to the magnitude of the vector sum of the generator output voltage and current.

Figure 16:
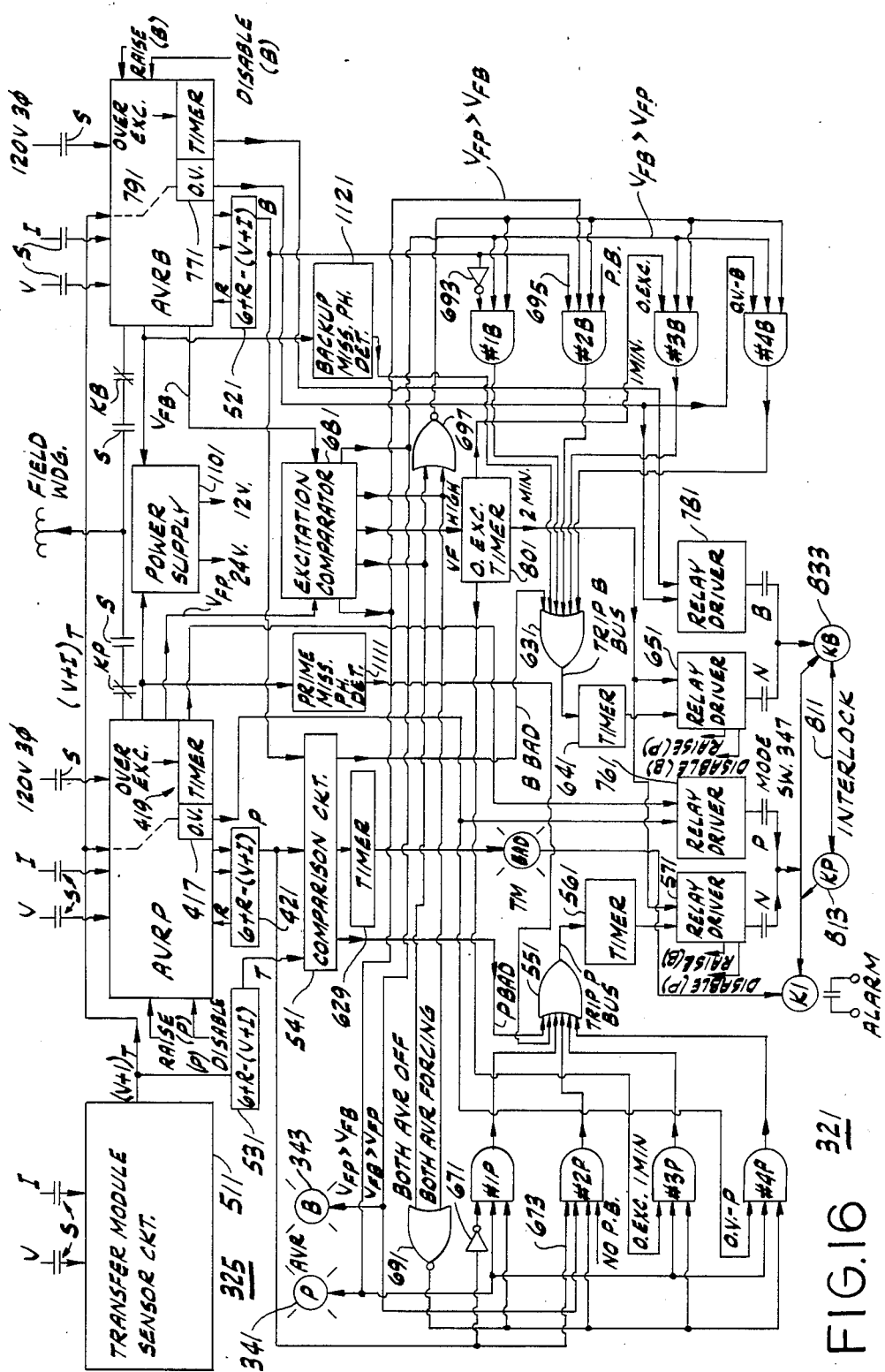
FIG. 16 is a detailed block diagram of the FIG. 9 regulating apparatus of the invention showing more features of the transfer module of the invention.

In the block diagram of FIG. 16 a preferred embodiment of transfer module 325 in regulating apparatus 321 has an all-hardware implementation. FIG. 16 shows the connections of voltage regulators AVRP and AVRB to the field winding of the generator in simplified singleline format. Several pairs of contacts of a section S of the mode switch 347 of FIG. 10 in the OFF position are open to manually isolate the voltage regulators AVRP and AVRB and transfer module from the generator output, from the field winding and from 120 volt, three-phase power. In all other positions of the mode switch, marked by N (NORMAL), P (PRIME) and B (BACKUP), the contacts of section S are closed. Also, the transfer module 325 has a sensor circuit 511 which is a duplicate of sensing circuit 411 of FIGS. 14 and 15. The transfer module 325 has associated with the voltage regulator AVRP the signal generating circuit 421 for producing the reference voltage R and the signal $[6+R-(V+I)]_P$. The transfer module 325 also has associated with the voltage regulator AVRB a signal generating circuit 521 for independently producing the reference voltage R and a signal $[6+R-(V+I)]_B$. Still a third signal generating circuit 531 independently produces an additional signal $[6+R-(V+I)]_T$. Circuits 521 and 531 are duplicates of signal generating circuit 421 of FIG. 14. Their voltage adjusting potentiometers, not shown, are ganged together and adjusted so that the generator 311 produces its desired nominal voltage at nominal frequency such as 60 Hertz.

Circuits 421 and 521 together constitute means for generating a first signal as a function of the generator output as sensed by the first voltage regulator sensing means and a second signal as a function of the generator output as sensed by the second voltage regulator sensing means. Circuits 421 and 521 include means (exemplified by circuit 441 in circuit 421 of FIG. 14 and the duplicate of circuit 441 in circuit 521) for producing the first and second signals as a function of both the frequency and the magnitude of the output of the generator as sensed by the first and second voltage regulator sensing means respectively. Circuits 421 and 521 each include an underfrequency rolloff circuit 11 of FIG. 1, which is an example of means for supplying a frequency dependent electrical reference that decreases with frequency of the generator below a predetermined rolloff frequency. The first and second signals (e.g., $[6+R-(V+I)]_P$ and $[6+R-(V+I)]_B$) are produced as a function of the frequency dependent electrical reference less the sum of the generator voltage and the generator current as sensed by the first and second voltage regulator sensing means respectively.

Circuits 511 and 531 together constitute means for independently producing an additional signal to which the first and second signals ordinarily have a predetermined relationship of equality because the first and second signals are both substantially equal in electrical value to the additional signal. Since circuits 511 and 531 are duplicates of circuits 411 and 421 of FIG. 14, they are an example of circuitry that also includes means for providing a signal representing the output of the generator, means for generating an electrical reference and means for generating the additional signal as a function of both the electrical reference and the signal representing the output of the generator. In particular, this circuitry 511 and 531 also provides a signal representing the output of the generator as the sum of the generator voltage and current, and has means for generating a frequency dependent electrical reference that decreases with frequency of the generator below a predetermined rolloff frequency. The additional signal (e.g., $[6+R-(V+I)]_T$) is generated as a function of the difference between the electrical reference and the signal representing the output of the generator.

In FIG. 16, the signals $[6+R-(V+-I)]_P$, $[6+R-(V+I)]_B$ and $[6+R-(V+I)]_T$ are respectively generated by circuits 421, 521 and 531 and fed to a comparison circuit 541 where they are analyzed to detect any departure from the expected equality. If the first signal $[6+R-(V+I)]_P$ is different from the other two, comparison circuit 541 outputs a high on a line marked P BAD, because a fault in voltage regulator AVRP is indicated. This high is conducted through a diode-OR gate 551, activating a timer 561. If timer 561 times out and the P BAD high still persists, a relay driver 571 trips the KP relay, assuming the mode switch 347 is in the NORMAL (N) position. Relay driver circuit 571 also supplies a Disable P signal to the the pulse width modulator (FIG. 14) in voltage regulator AVRP, and also supplies a RAISE B signal to the voltage regulator AVRB to increase its reference level to 100%. Together, comparison circuit 541, OR-gate 551, timer 561 and relay driver 571 constitute means for selecting the first or second voltage regulator to energize the generator field winding, the selection depending on whether or not there is a departure of the first signal from the predetermined relationship to the additional signal when the second signal maintains its predetermined relationship thereto.

Figures 17, 18, 19, 20, 21:
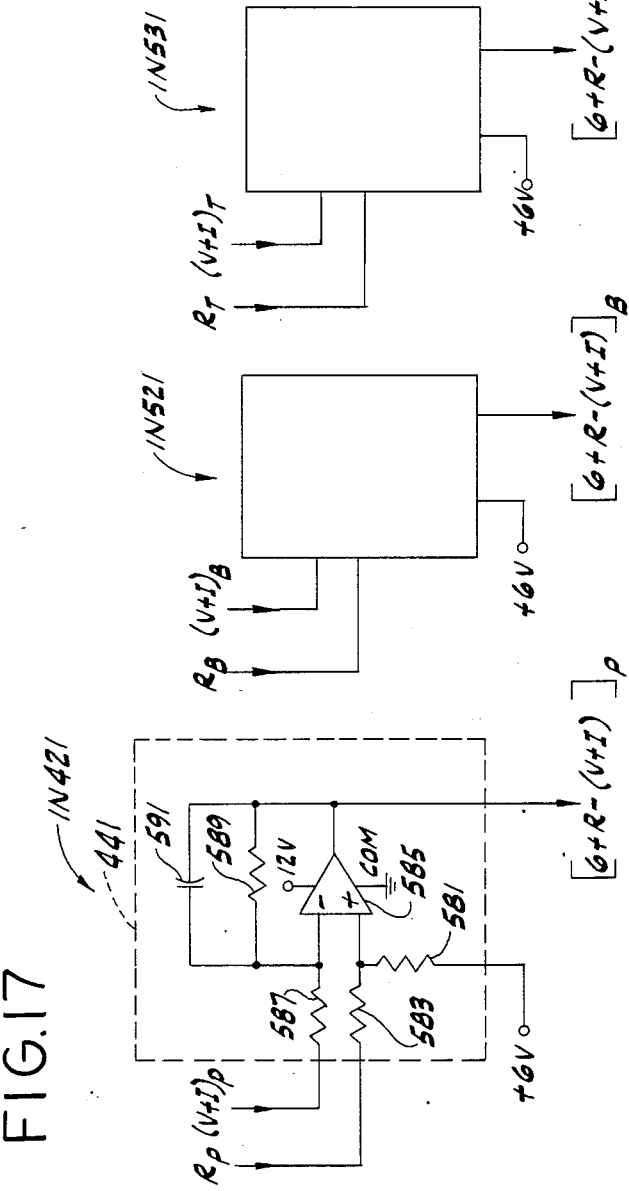
FIG. 17 is a block diagram of three identical circuits for generating signals representing deviation of generator output, as independently sensed by three sensing circuits of the type in FIG. 15, from three frequency-dependent electrical reference voltages independently supplied by three circuits of the type in FIG. 1, wherein FIG. 17 includes a schematic diagram of one of the three identical circuits.
FIGS. 18, 19, 20 and 21 are diagrams representing a comparison of levels of the signals from the three circuits of FIG. 17 and interpreting the comparison as normal operation or as a malfunction in a voltage regulator or the transfer module.

FIG. 17 illustrates three identical difference amplifier circuits in each of the signal generating circuits 421, 521 and 531 of FIG. 16 which respectively generate the signals $[6+R-(V+I)]_P$, $[6+R-(V+I)]_B$ and $[6+R-(V+I)]_T$. For conciseness, only the schematic of circuit 441 in signal generating circuit 421 is shown. A fixed electrical level of six volts (6V) is summed by resistors 581 and 583 with the frequency-dependent reference R produced in circuit 421. The sum is provided to the noninverting (+) input of an operational amplifier 585. The generator output V+I, as sensed by circuit 411 in voltage regulator AVRP, is supplied through a resistor 587 to the inverting (−) input of amplifier 585. A resistor 589 is connected between the amplifier 585 output and its inverting input to establish the gain thereof. A noise-suppressing capacitor 591 is connected across resistor 589.

Subscripts P, B and T are associated with the R (reference voltage) and V+I inputs to indicate their origin in association with the AVRP regulator, the AVRB regulator and the transfer module respectively. Similarly, the R−(V+I) signals have P, B and T subscripts to indicate their origin in circuits 421, 521 and 531 respectively.

The operation of comparison circuit 541 of FIG. 16 is now explained. FIGS. 18, 19, 20 and 21 illustrate four examples of levels that the R−(V+I) signals can have relative to each other. For brevity, only their subscripts are indicated above respective lines indicating the levels.

In FIG. 18, all the levels are equal. Comparison circuit 541 leaves all three of its output lines (P BAD, B BAD, T BAD) low.

In FIG. 19, the P signal is higher in level than the other two levels for B and T, which are equal. Comparison circuit 541 decides that there is a problem associated with regulator AVRP and sets its P BAD output line high, leaving B BAD and T BAD low.

In FIG. 20, the B signal is lower in level than the other two levels for P and T, which are equal. Comparison circuit 541 decides that there is a problem associated with regulator AVRB and sets its B BAD output line high, leaving P BAD and T BAD low.

In FIG. 21, the T signal is lower in level than the other two levels for P and B, which are equal. Comparison circuit 541 decides that there is a problem associated with the transfer module and sets its T BAD output line high, leaving P BAD and B BAD low.

Figure 22:
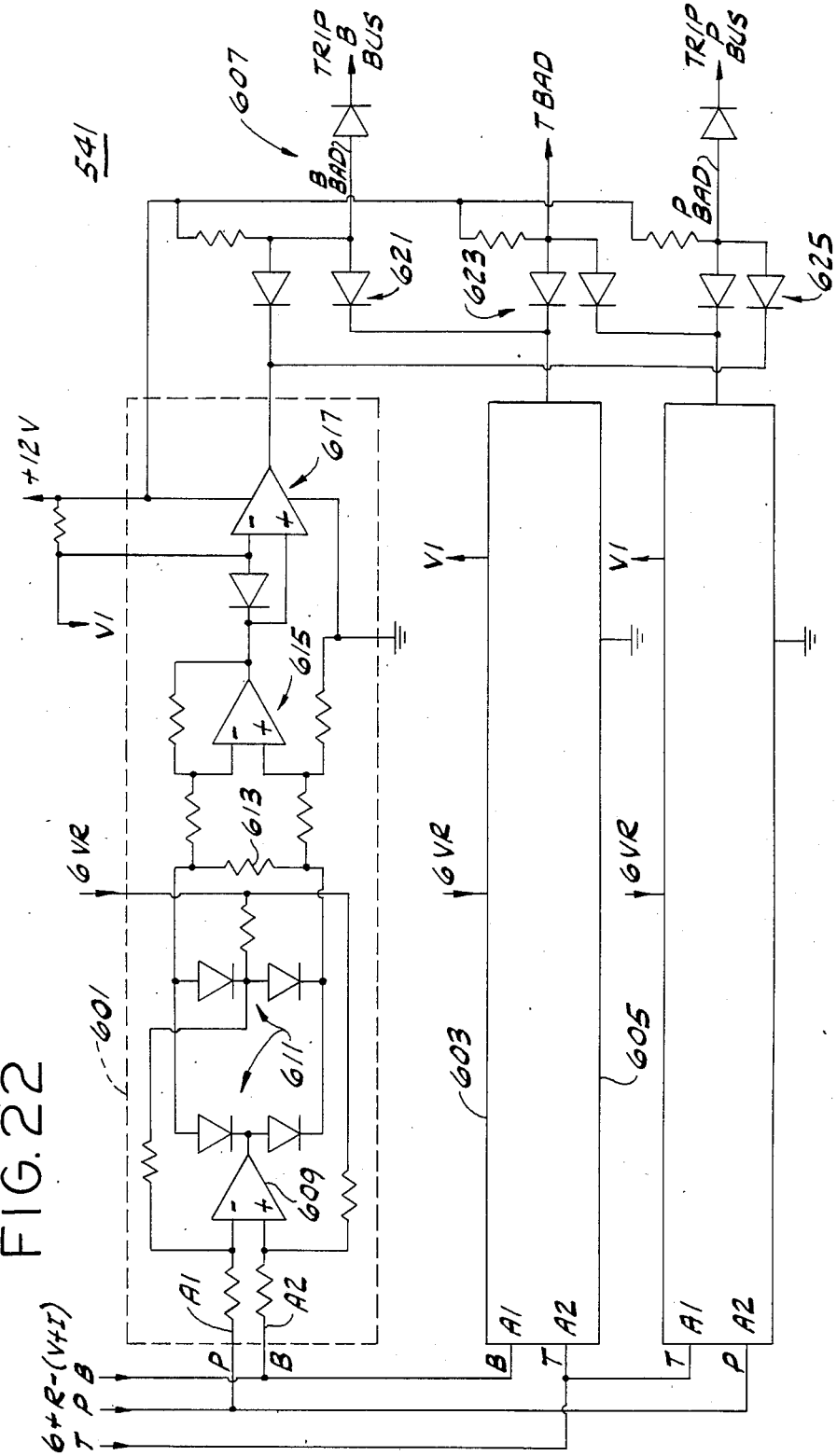
FIG. 22 is partially schematic, partially block diagram of a circuit in the transfer module for implementing the comparison and interpretation represented in FIGS. 18–21.

In FIG. 22, the functions described in FIGS. 18-21 are accomplished in comparison circuit 541 by means of three identical subtracting circuits 601, 603 and 605 and a logic network 607.

Each of the subtracting circuits supplies a high output to the logic network 607 if an excessive electrical difference occurs between the voltages applied to its inputs marked A1 and A2. Only the magnitude of the difference, and not its sign, is considered in this circuit example. The P and B signals are supplied respectively to inputs A1 and A2 of subtracting circuit 601. Correspondingly, the B and T signals are supplied to inputs A1 and A2 of circuit 603, and the T and P signals to inputs A1 and A2 of circuit 605.

Subtracting circuit 601 is shown in schematic detail. An operational amplifier 609 and a diode bridge 611 produce a voltage across a resistor 613 which is proportional to the absolute value of the difference between the voltages applied to inputs A1 and A2. The voltage across resistor 613 is amplified by an operational amplifier 615 and applied to a comparator circuit 617 to determine if it is excessive, whence a high appears at the output thereof.

If one of the P, B and T signals departs in value from the other two of the signals, only one of the subtracting circuits will continue to have a low output corresponding to the two signals which are still equal. The other two of the three subtracting circuits have a high output. Logic network 607 amounts to three diode-AND gates 621, 623 and 625 with inputs connected to the subtracting circuits to identify which two subtracting circuits have a high output at such time of a malfunction in P, B or T. Each of the AND gates 621, 623 and 625 has its output marked in FIG. 22 with the corresponding unit P, B or T which must be bad (by producing a signal level that departs from the others) to cause an output high from that AND gate.

In this way, subtracting circuits 601 and 605 and AND gate 625 constitute means for determining a first electrical difference between the first signal and the second signal (e.g. P and B) and a second electrical difference between the first signal and the additional signal (e.g. P and T), and means for preventing the first voltage regulator from energizing the generator field winding upon an excessive value of the first electrical difference occurring simultaneously with an excessive value of the second electrical difference.

Also, subtracting circuits 603 and 605 and AND gate 623 drive a timer 629 and a "TM BAD" light in FIG. 16. Together, these circuits constitute means for also determining a first electrical difference between the first signal and the additional signal and a second electrical difference between the second signal and the additional signal, and means for displaying an indication that the means for producing the additional signal is in error upon an excessive value of the first electrical difference occurring simultaneously with an excessive value of the second electrical difference.

Further, subtracting circuits 601 and 603 and AND gate 621 of FIG. 22 constitute means for also determining a first electrical difference between the first signal and the second signal and a second electrical difference between the second signal and the additional signal, and means for preventing the second voltage regulator from energizing the generator field winding upon an excessive value of the first electrical difference coinciding with an excessive value of the second electrical difference. When AND gate 621 supplies a high on line B BAD in FIG. 16, the high is conducted by one of the diodes of a diode-OR gate 631 in FIG. 16 to a timer 641. If the high persists beyond a time period established by timer 641, then timer 641 actuates a relay driver 651. In the NORMAL mode, relay driver 651 trips the KB relay to prevent second regulator AVRB from energizing the field winding. Also the relay driver circuit 651 supplies a Disable B signal to the pulse width modulator of the regulator AVRB, and a RAISE P signal to the regulator AVRP if its reference level is not already set to 100%.

The circuitry of the transfer module 325 in FIG. 16 also includes circuitry that further detects loss of capacity by a regulator to regulate the generator output. This circuitry produces a signal upon an excessive deviation of the output of the generator, as sensed by one of the output sensing means in a regulator AVRP or AVRB itself, from the frequency-dependent reference level of the $R-(V+I)$ circuit 421 or 521 corresponding to that regulator.

Signal circuit 421 is connected through an inverter 671 that compares the signal $6+R-(V+I)$ for regulator AVRP with a 4 volt level. If the signal falls below that level the output of inverter 671 goes high at an AND gate #1P. The same signal $6+R-(V+I)$ for regulator AVRP is also compared at the input of an AND gate #2P with an 8 volt level. If the signal rises above that 8 volt level, an input 673 of AND gate #2P is enabled. The AND gates #1P and #2P implement corresponding sets of anded (&) row entries in the left column of Table I for regulator malfunction conditions. Two other AND gates #3P and #4P implement further entries in Table I corresponding in column positions to the positions of the AND gates of FIG. 16. The AND gates #1P, #2P, #3P and #4P all have their outputs connected to OR gate 551 which, through timer 561 and relay driver 571, substitutes the regulator AVRB for AVRP when the conditions represented by the entries in Table I are met.

For example, AND gate #1P cannot provide an output high unless all three of its inputs are high. If the $6+R-(V+I)$ signal for regulator AVRP becomes excessively low, this generally means that generator output is excessively high, and a first input of AND gate #1P goes high. An excitation comparator circuit 681 compares the excitation voltages $V_{FP}$ and $V_{FB}$ from regulators AVRP and AVRB respectively. If $V_{FP}$ exceeds $V_{FB}$, a line so marked in FIG. 16 goes high at the second input of each of AND gates #1P, #3P and #4P. If both AVRP and AVRB are off (both producing less than a predetermined minimum excitation) or both AVRP and AVRB are forcing (both producing more than a predetermined maximum excitation), then a disabling low is produced by a diode NOR gate 691 to all of the AND gates #1P, #2P, #3P and #4P.

Inverter 671 and AND gate #1P thus constitute means for producing a fourth signal upon an excessive deviation of the output of the generator, as sensed by one of the output sensing means, from the frequency-dependent reference level of one of the reference level supplying means.

AND gate #1P also thus constitutes means for coupling the signal to said substituting means, and excitation comparator 681 is an example of means for disabling the coupling means when the excitation from the first voltage regulator is less than the excitation from the second voltage regulator and the generator output is higher than the frequency-dependent reference level.

Excitation comparator 681 compares the excitation from the first voltage regulator to the excitation from the second voltage regulator. Inverter 671 and AND gate #1P provide a signal upon an excessive deviation of the output of the generator above the first regulator reference level and AND gate #2P provides a separate signal upon an excessive deviation of the output of the generator below the first regulator reference level. AND gates #1P and #2P also act as means connected to the comparing means for coupling the first-named signal to the substituting means unless the first regulator excitation is less than the second regulator excitation and for coupling the separate signal as the signal to said substituting means unless the first regulator excitation is greater than the second regulator excitation.

An inverter 693 and a further set of AND gates #1B, #2B, #3B and #4B are connected to signal circuit 521 in an analogous manner to the AND gates #1P, #2P, #3P and #4P described above. Signal circuit 521 is connected to inverter 693 which compares the signal $6+R-(V+I)$ for regulator AVRB with a 4 volt level. If the signal falls below that level the output of inverter 693 goes high at AND gate #1B. The same signal $6+R-(V+I)$ for regulator AVRB is also compared at the input of AND gate #2B with an 8 volt level. If the signal rises above that 8 volt level, an input 695 of AND gate #2B is enabled. The AND gates #1B and #2B implement corresponding entries in the right-hand column of Table I for regulator AVRB malfunction conditions. The two other AND gates #3B and #4B implement further entries in Table I. The AND gates #1B, #2B, #3B and #4B all have their outputs connected to OR gate 631 which, through timer 641 and relay driver 651, prevents the regulator AVRB from energizing the field winding when the conditions represented by the right-column entries in Table I are met.

For example, AND gate #1B cannot provide an output high unless all three of its i1nputs are high. If the $6+R-(V+I)$ for regulator AVRB becomes excessively low, this generally means that generator output is excessively high, and a first input of AND gate #1B goes high. Excitation comparator circuit 681 compares the excitation voltages $V_{FP}$ and $V_{FB}$ from regulators AVRP and AVRB respectively. If $V_{FB}$ exceeds $V_{FP}$, a line so marked in FIG. 16 goes high at the second input of each of AND gates #1B, #3B and #4B. If both AVRP and AVRB are off (both producing less than a predetermined minimum excitation) or both AVRP and AVRB are forcing (both producing more than a predetermined maximum excitation), then a disabling low is produced by a diode NOR gate 697 to all of the AND gates #1B, #2B, #3B and #4B.

Excitation comparator 681 in FIG. 16 is connected to display lamps 341 and 343 of FIG. 10 so that a high on the line marked for $V_{FP}$ greater than $V_{FB}$ causes "P" lamp 341 to illuminate. Correspondingly, a high on the line marked for $V_{FB}$ greater than $V_{FP}$ causes "B" lamp 343 to illuminate. The circuit is so arranged because diodes 331 and 333 of FIG. 9 operate to put the regulator with the greater excitation in control of the field winding.

Figure 23:
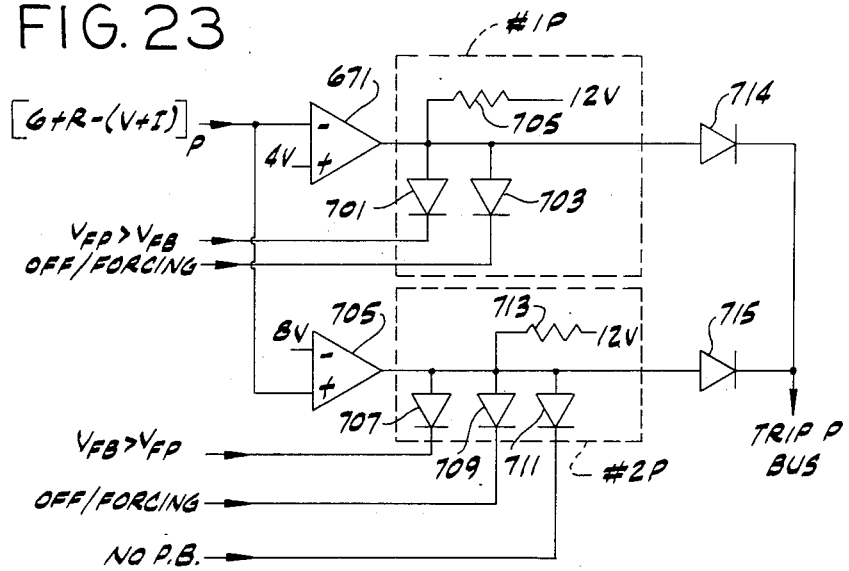
FIG. 23 is a schematic diagram of a representative part of comparator and logic circuitry in the transfer module of FIG. 16.

In FIG. 23 inverter 671 of FIG. 16 is a comparator with signal $[6+R-(V+I)]_P$ supplied to its inverting $(-)$ input and a 4 volt level provided to the noninverting $(+)$ input. Inverter 671 is connected to AND-gate #1P which includes two diodes 701 and 703 having their anodes connected to the output of inverter 671. A pullup resistor 705 is connected between the output of inverter 671 and the 12 volt supply. The line from excitation comparator 681 in FIG. 16 marked $V_{FP}$ greater than $V_{FB}$ is connected to the cathode of diode 701. The low-active output line from NOR gate 691 is marked OFF/FORCING (Off or Forcing) in FIG. 23 and is connected to the cathode of diode 703.

In FIG. 23 a comparator 705 has signal $[6+R-(V+I)]_P$ supplied to its noninverting (+) input and an 8 volt level provided to the inverting (−) input. Comparator 705 is connected to AND-gate #2P which includes three diodes 707, 709 and 711 having their anodes connected to the output of comparator 705. A pullup resistor 713 is connected between the output of comparator 705 and the 12 volt supply. The line from excitation comparator 681 marked $V_{FB}$ greater than $V_{FP}$ is connected to the cathode of diode 707, and the low-active output line from NOR gate 691 marked OFF/FORCING is connected to the cathode of diode 709. Another line marked NO P.B., which is high when the pushbutton P.B. 349 is not depressed, is connected to the cathode of diode 711. A pair of diodes 714 and 715 in OR-gate 551 are respectively connected at their anodes to the outputs of AND gates #1P and #2P, and connected together at their cathodes to the TRIP P bus.

Figure 24:
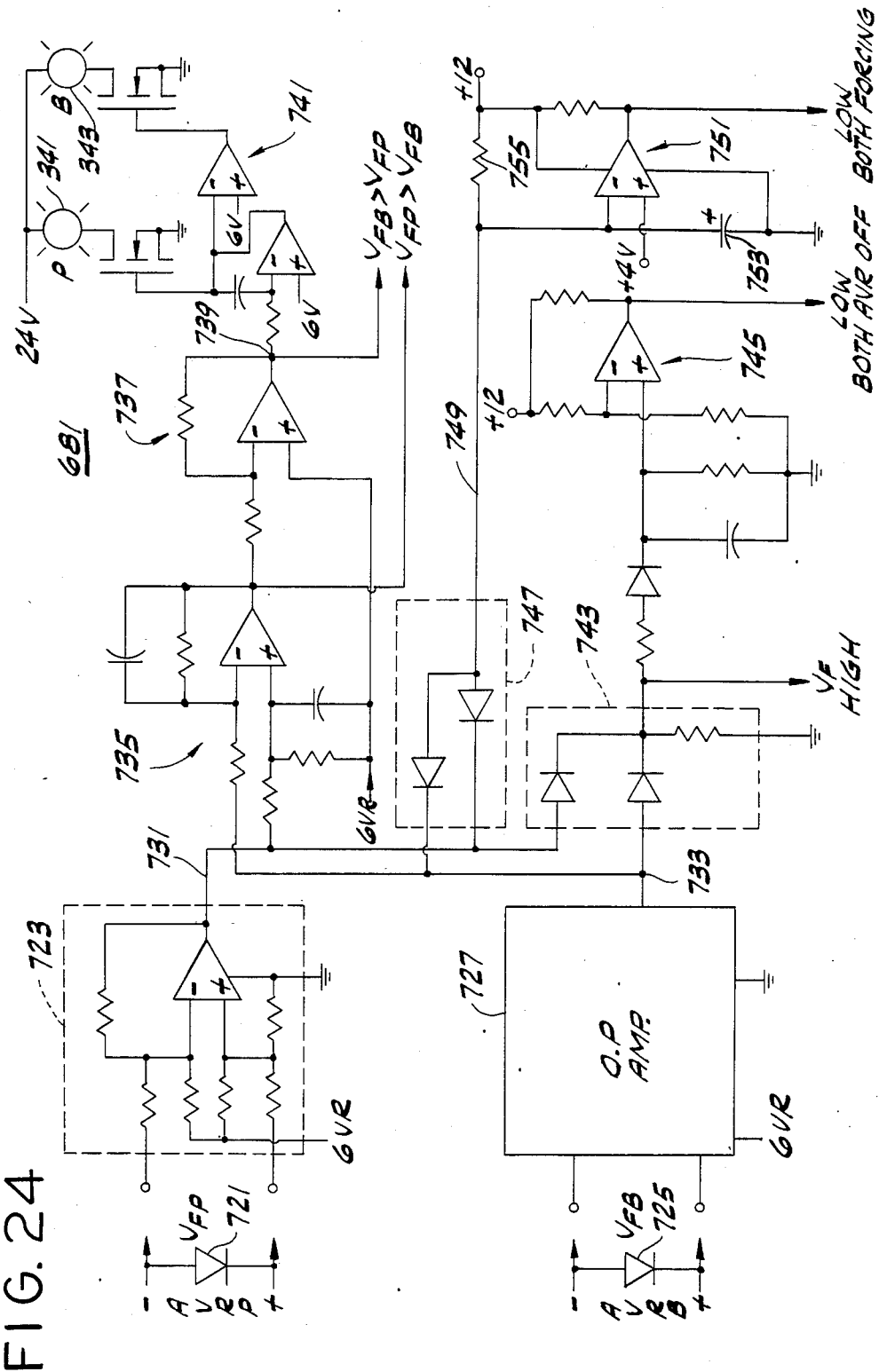
FIG. 24 is a schematic diagram of an excitation comparator in the transfer module of FIG. 16.

In FIG. 24 the circuits of excitation comparator 681 of FIG. 16 are shown in schematic detail. Excitation $V_{FP}$ from voltage regulator AVRP appears across a free-wheeling diode 721 internal to regulator AVRP and is connected to an operational amplifier 723 referenced to six volts (6VR) and voltage dividing the output of the voltage regulator AVRP by a factor of about 40:1. Excitation $V_{FB}$ from voltage regulator AVRB appears across a freewheeling diode 725 internal to regulator AVRB and is connected to an operational amplifier 727 that is identical in internal circuit construction to amplifier 723. Output lines 731 and 733 from operational amplifiers 723 and 727 are coupled to inputs of a comparator circuit 735 that is also referenced to 6 volts, the output of which is designated as the line $V_{FP}$ greater than $V_{FB}$. When the voltage at output 731 corresponding to excitation $V_{FP}$ is greater than the voltage at output 733 corresponding to excitation $V_{FB}$, the output of comparator circuit 735 goes high. Comparator circuit 735 feeds an inverter circuit 737 that provides a complementary output 739 on the line marked $V_{FB}$ greater than $V_{FP}$.

The output 739 from inverter 737 drives a lamp driver circuit 741. Lamp driver circuit 741 has a pair of comparators referenced to six volts and feeding the gates of a pair of field effect transistors (FETs) respectively connected between indicator lamps 341 and 343 and a 24 volt supply. In this way, "P" lamp 341 is on when output 739 is low, and "B" lamp 343 is on when output 739 is high.

Operational amplifier 723 and 727 outputs 731 and 733 are connected to two inputs of a diode circuit 743, which has an output line labeled $V_F$HIGH. This output line $V_F$ HIGH carries a voltage if there is excitation from either regulator AVRP or AVRB. The $V_F$HIGH voltage is fed to the noninverting input of a comparator circuit 745 where it is compared to an approximately 2 volt reference derived by voltage division from the 12 volt supply to the inverting input. The output of comparator circuit 745 is labelled LOW BOTH AVR OFF because it is low when the $V_F$HIGH voltage is less than the predetermined 2 volt reference that is proportional to a minimum level of excitation for either regulator AVRP or AVRB.

Operational amplifier 723 and 727 outputs 731 and 733 are also connected to two inputs of a diode circuit 747, which has an output line 749. This output line 749 carries a voltage proportional to the lesser of the excitations from regulators AVRP and AVRB. The lesser voltage is fed to the inverting input of a comparator circuit 751 where it is compared to a 4 volt reference derived by voltage division from the 12 volt supply to the noninverting input. The output of comparator circuit 751 is low when both AVR outputs are forcing, i.e. when they are full on. When both AVRs are forcing, there are no off periods between excitation pulses to discharge a capacitor 753 connected between the inverting input of comparator 751 and ground. Unless there is forcing, there is not sufficient time for capacitor 753 to be charged from 12 volts through a resistor 755. When forcing occurs, circuit 751 output is then low because the output 749 voltage becomes greater than the predetermined 4 volt reference due to charging of capacitor 753.

Operational amplifiers 723 and 727 together with diode circuit 743 and comparator circuit 745 thus constitute means for detecting whether the first and second voltage regulators are both supplying less than a predetermined low level of excitation. AND gates #1P and #2P of FIG. 23 constitute means connected to said detecting means for coupling the first-named signal (e.g. excessive deviation either way in $[6+R-(V+I)]_P$ signal) to the substituting means (e.g. relay driver to trip KP relay) unless the first and second voltage regulators are both supplying less than the predetermined low level of excitation.

Operational amplifiers 723 and 727 together with diode circuit 747 and comparator circuit 751 constitute means for detecting whether the first and second voltage regulators are both supplying more than a predetermined high level of excitation. AND gates #1P and #2P of FIG. 23 also constitute means connected to said detecting means for coupling the signal (e.g. excessive deviation either way in $[6+R-(V+I)]_P$ signal) to the substituting means (e.g. relay driver to trip KP relay) unless the first and second voltage regulators are both supplying more than the predetermined high level of excitation.

In another feature of transfer module 325 of FIG. 16, the output of overvoltage circuit 417 of regulator AVRP is connected to an input of AND-gate #4P and to a second KP relay driver 761. Also, the corresponding output of an overvoltage circuit 771 in regulator AVRB (identical to overvoltage circuit 417 of regulator AVRP) is connected to an input of AND-gate #4B and to a second KB relay driver 781. Each of the overvoltage circuits 417 and 771 are connected to the transfer module sensor circuit 511 output $(V+I)_T$, so that an excessive output from generator 311 causes the regulator AVRP or AVRB that is in control at the time (greater excitation $V_{FP}$ or $V_{FB}$) to be isolated from the field winding by tripping the corresponding KP or KB relay.

In a further feature in FIG. 16, overexcitation circuit 419 of regulator AVRP includes a circuit and timer that detects excessive excitation that persists longer than a preestablished time and supplies a transformer-coupled output pulse to KP relay driver 761, which however only trips the KP relay in the P position of the mode switch. A corresponding overexcitation circuit 791 of regulator AVRB is identical to circuit 419, and circuit 791 supplies a transformer-coupled output pulse to KB relay driver 781, which however only trips the KB relay in the B position of the mode switch. Transfer module 325 provides advantageous redundancy in the NORMAL mode by providing an overexcitation timer 801 connected at an input to the $V_F$ HIGH line from excitation comparator 681 (FIGS. 16 and 24).

If an excessive excitation from either regulator is detected by overexcitation timer 801 and persists for at least one minute, highs are supplied to a respective O. EXC. input of each of AND gates #3P and #3B where they are subject to qualifying inputs that determine which regulator is responsible for the overexcitation according to Table I. If, however, the overexcitation persists for at least two minutes, overexcitation timer 801 supplies highs P-2MINTRIP and B-2MINTRIP without qualification to relay drivers 571 and 651 respectively. In this way, both relays KP and KB are tripped to isolate both regulators AVRP and AVRB and protect generator 311.

Figure 25:
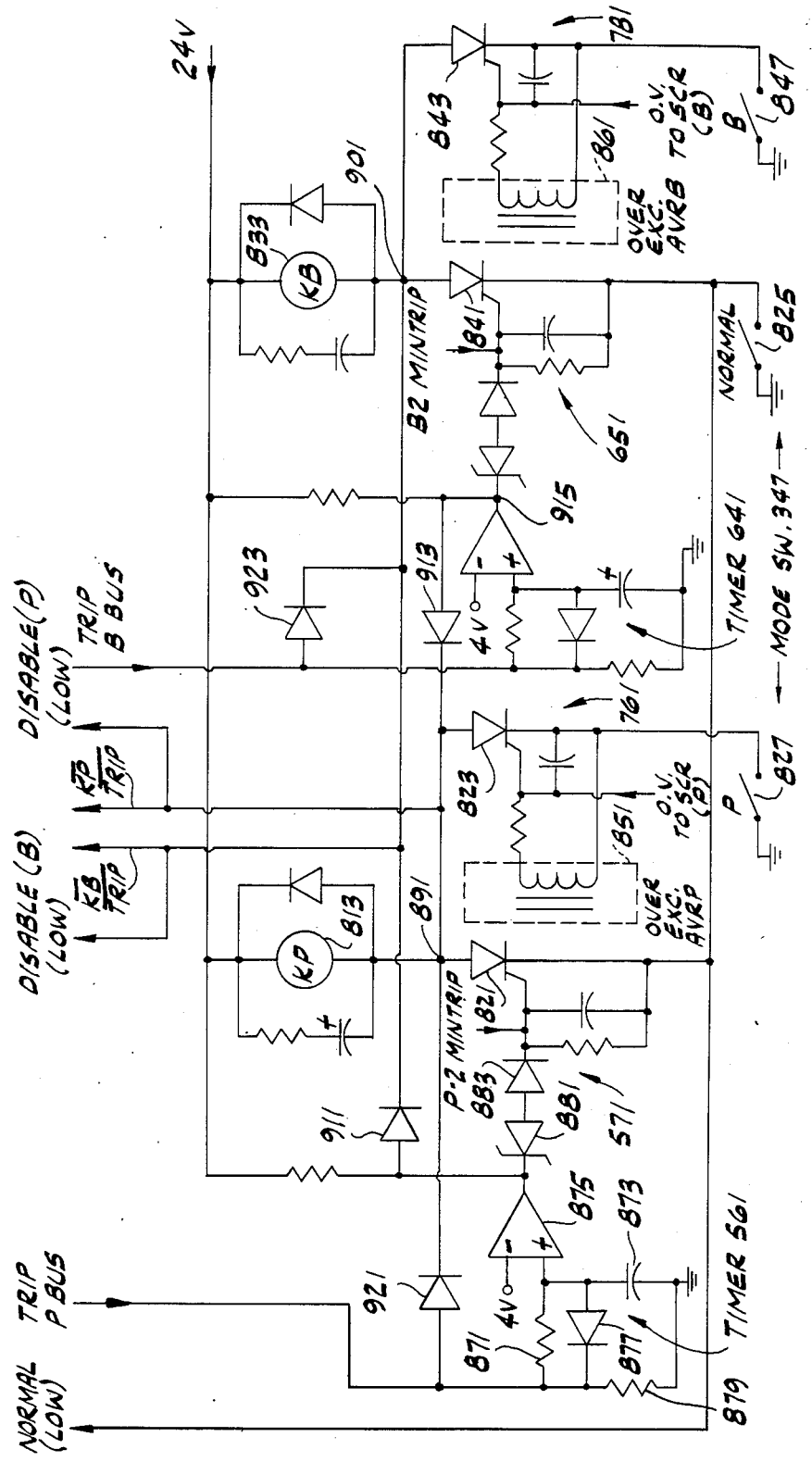
FIGS. 25 and 26 are schematic diagrams of timer and relay driver circuits in the transfer module of FIG. 16, including circuits for raising electrical references for the voltage regulators.
Figure 26:
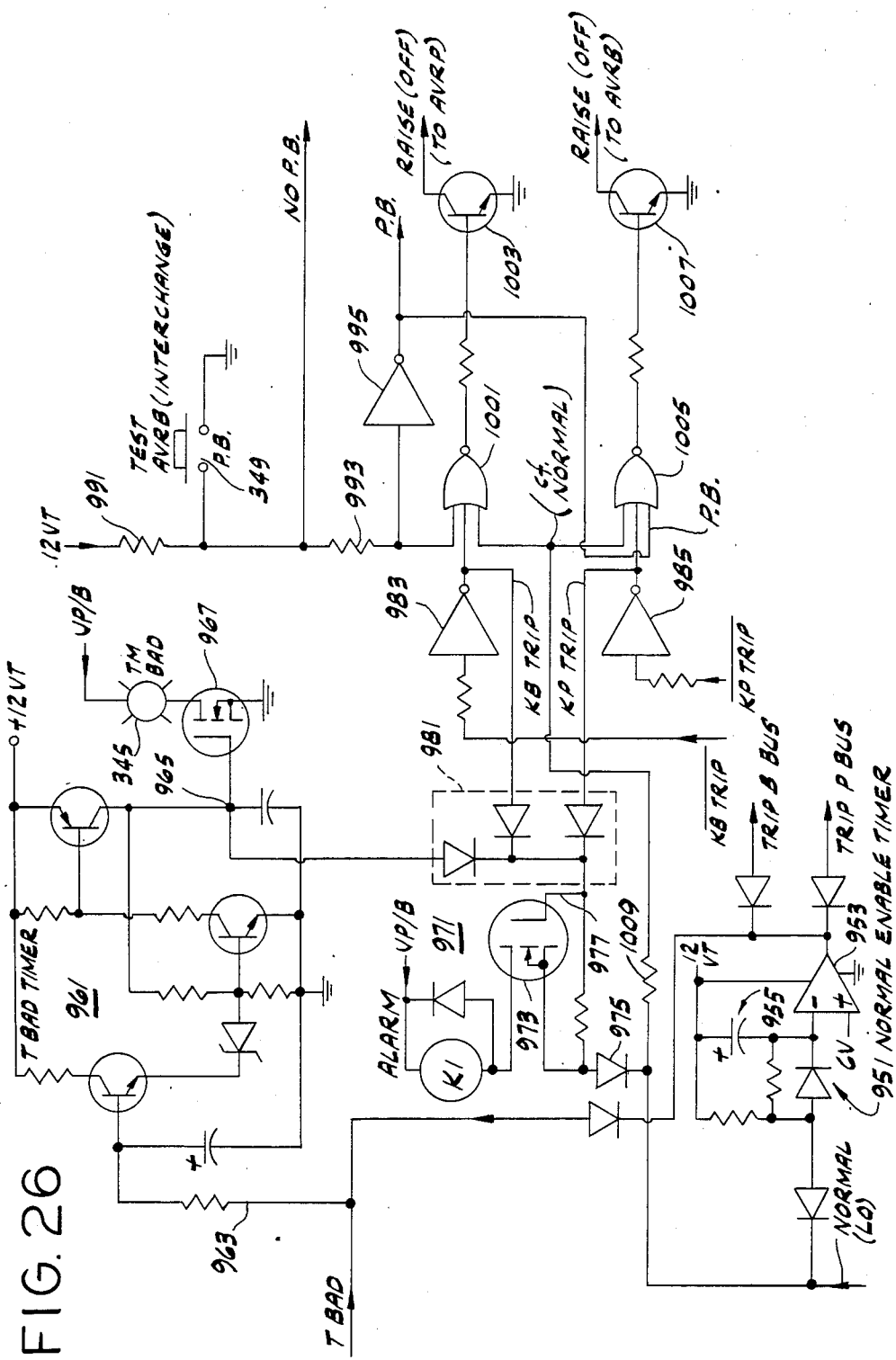

FIGS. 25 and 26 show in schematic form the circuitry represented in FIG. 16 by timers 561 and 641, relay drivers 571, 761, 651 and 781, mode switch 347 and an interlock arrangement 811.

In FIG. 25, a relay coil 813 of the KP relay is connected between 24 volt supply power and the anodes of two silicon controlled rectifiers (SCRs) 821 and 823. The two SCRs 821 and 823 are in KP relay drivers 571 and 761 respectively. The cathode of SCR 821 is connected to a line labelled NORMAL (LOW) which connects to a mode switch section 825 that completes a circuit to ground in the NORMAL mode. The cathode of SCR 823 is connected to another mode switch section 827 which completes a circuit to ground in the PRIME (P) mode.

A relay coil 833 of the KB relay is connected between the 24 volt supply power and the anodes of two more SCRs 841 and 843. The two SCRs 841 and 843 are in KB relay drivers 651 and 781 respectively. The cathode of SCR 841 is connected to the same mode switch section 825 (NORMAL) as the cathode of SCR 821. The cathode of SCR 843 is connected to another mode switch section 847 which completes a circuit to ground in the BACKUP (B) mode.

SCRs 821 and 841 can be triggered directly by a high at their respective gates on lines P-2MINTRIP and B-2MINTRIP from overexcitation timer 801 of FIG. 16. SCRs 823 and 843 can be triggered directly by a high at their respective gates on a line O.V. TO SCR (P) from regulator AVRP and a line O.V. TO SCR (B) from regulator AVRB. These lines come from the O.V. TO SCR output of the overvoltage circuit 417 of FIG. 14 (or 771 of FIG. 16) in each regulator. Also, in FIG. 25, the gates of these two SCRs 823 and 843 are triggerable from the secondaries of a pair of pulse transformers 851 and 861 in the overexcitation circuits 419 and 791 in regulators AVRB and AVRP. When any of the SCRs is triggered the corresponding relay is tripped, and the triggered SCR continues to conduct until power is shut off, such as by changing the mode setting of mode switch 347.

In operation, the circuitry of FIG. 25 serves to trip on all malfunction analysis features in the NORMAL mode, and trip only on overexcitation or overvoltage in the PRIME or BACKUP modes.

In the NORMAL mode the interlock 811 of FIG. 16 operates so that if one relay is tripped, the other relay is prevented from tripping. For example, if the TRIP P BUS goes high at timer 561, a capacitor 873 charges with 0.4 second time constant through a resistor 871 connected between capacitor 873 and the TRIP P BUS. Capacitor 873 is connected between the noninverting input of a comparator 875 and common. A fixed 4 volt level is fed to the inverting input of comparator 875. If TRIP P BUS goes low before capacitor 873 charges to over 4 volts, the output of comparator 875 remains low, and capacitor 873 rapidly discharges through a diode 877 in series with a low-value resistor 879 to ground. If capacitor 873 does charge to over 4 volts, the output of comparator 875 goes high and triggers SCR 821 through a zener diode 881 and a diode 883. SCR 821 turns on and its anode voltage on a line 891 goes low, causing current flow through KP relay coil 813 and tripping the KP relay. Analogous discussion of the identical circuitry involving the TRIP B BUS, timer 641, relay driver 651 with SCR 841, and the KB relay is omitted for brevity.

When the SCR 821 is triggered and the voltage on line 891 goes low, this low is supplied to regulator AVRP on a line DISABLE (P) (LOW) to disable its pulse width modulator 445 and is also supplied on a low-active line KP/ TRIP/ connected to the circuitry of FIG. 26. When the SCR 841 is triggered, its anode voltage on a line 901 goes low. This low is supplied to regulator AVRB on a line DISABLE (B) (LOW) to disable its pulse width modulator and is also supplied on a low-active line KB/ TRIP/ connected to the circuitry of FIG. 26.

Interlock 811 of FIG. 16 is implemented by two diodes 911 and 913 in FIG. 25. If relay KB has already been tripped, line 901 is low. Consequently, diode 911 holds the output of comparator 875 low and prevents it from going high because the anode of diode 911 is connected to the comparator 875 output and its cathode is connected to line 901. On the other hand, if relay KP is tripped and a high subsequently appears on the TRIP B BUS, line 891 is already low. Consequently, diode 913 holds an output 915 of timer 641 low and prevents it from going high because the anode of diode 913 is connected to the timer 641 output and its cathode is connected to line 891.

A further advantageous feature is provided by a pair of diodes 921 and 923 which respectively clamp the TRIP P BUS or the TRIP B BUS low after a relay KP or KB trip to discharge the capacitor in the timer 561 or 641 that caused the trip.

The circuitry of FIG. 25 constitutes means for preventing energization of the field winding by at least one of the first and second voltage regulators in response to a signal, e.g. on the TRIP P BUS.

In FIG. 26 a mode sensitive timer circuit 951 is connected at an input to the NORMAL (LOW) line from FIG. 25 and has a comparator 953 which in any mode except the NORMAL mode disables and clamps a low through respective diodes connected to the TRIP P BUS, the TRIP B BUS, and the line T BAD. When the mode switch grounds the NORMAL line in the NORMAL mode, an RC circuit 955 charges with 5 second time constant and causes the voltage at an inverting input of comparator 953 to go to zero. Since the noninverting input of comparator 953 is supplied with a fixed 6 volt level, its output goes high and lifts the disabling low in the NORMAL mode. When the mode switch is changed to another mode, the RC circuit 955 discharges rapidly, lifting the inverting input of comparator 953 to 12 volts and supplying an disabling low again.

If a high occurs and persists for at least several seconds on the T BAD line, a timer circuit 961 connected at an input 963 detects the high and produces a high at an output 965. The output 965 high actuates a FET switch 967, permitting current to flow from the 24 volt VP/B supply line through TM BAD lamp 345 of FIG. 10 to display a malfunction in the transfer module 325.

An alarm relay K1 connected to the 24 volt VP/B supply line is actuated by a circuit 971 having a FET switch 973 connected in series with a diode 975 to the NORMAL line. In the NORMAL mode FET 973 and diode 975 provide a path to ground when a gate 977 of FET 973 goes high. Otherwise, FET 973 is disabled.

The gate 977 of FET 973 is connected to the output of a diode OR gate 981, the inputs of which are connected to the output 965 of the TM BAD timer 961, a line KB TRIP which goes high when relay KB (FIG. 25) is tripped, and a line KP TRIP which goes high when relay KP is tripped. The signal on line KB TRIP is supplied by an inverter 983 fed with the low active KB/ TRIP/ line from FIG. 25, and the signal on line KP TRIP is supplied by an inverter 985 fed with the low active KP/ TRIP/ line from FIG. 25. Therefore, in the NORMAL mode the alarm relay K1 is actuated if either the transfer module sensing is malfunctioning or the KP or KP relay is tripped.

The TEST AVRB P.B. pushbutton switch 349 is connected in series with a pullup resistor 991 between 12 volt supply voltage and common. A line NO P.B. (high when P.B. 349 is not depressed) is connected to switch 349. A resistor 993 is connected between line NO. P.B. and the input of an inverter 995. The output of inverter 995 drives a line P.B. which is thus made high when pushbutton 349 is depressed.

A first NOR gate 1001 has an output which is active low for turning off a transistor 1003 which is connected to regulator AVRP to raise its reference level to 100%. A second NOR gate 1005 has an output which is active low for turning off a transistor 1007 which is connected to regulator AVRB to raise its reference level to 100%. A first input of NOR gate 1001 is connected through resistor 993 to the line NO P.B., and a first input of NOR gate 1005 is connected to the line P.B. A second input of NOR gate 1001 is connected to the line KB TRIP, and a second input of NOR gate 1005 is connected to the line KP TRIP. A third input of each of NOR gates 1001 and 1005 is connected through one resistor 1009 to the NORMAL line.

The reference level of regulator AVRP is thus raised if the pushbutton 349 is not depressed, or if KB is tripped, or if the mode is other than the NORMAL mode. The reference level of regulator AVRB is raised if the pushbutton 349 is depressed, or if KP is tripped, or if the mode is other than the NORMAL mode.

The TEST AVRB P.B. pushbutton switch 349 and its associated circuitry 995, 1001, 1003, 1005, 1007 in FIG. 26 thus constitutes means connected to the voltage regulators for selectively reversing the roles of said first and second voltage regulators, or interchanging them, so that said second voltage regulator ordinarily energizes the field winding and means connected to said reversing means and responsive to the signal of excessive deviation for electrically substituting said first voltage regulator for said second voltage regulator to energize the generator field winding, whereby regulation is transferred from the second to the first voltage regulator after the excessive deviation.

The timer 561 and KP relay circuitry associated with SCR 821 in FIG. 25 is an example of means connected to the signal producing means and responsive to the signal (e.g., of excessive deviation of the output of the generator from the first regulator reference level) for preventing the first voltage regulator from energizing the generator field winding. In FIG. 26 inverter 985, NOR gate 1005 and transistor 1007 together exemplify means for raising the second reference level after the signal occurs, to cause the second voltage regulator to regulate the output of the generator to approximately the first reference level, whereby regulation to such level is transferred from the first to the second voltage regulator.

Figure 27:
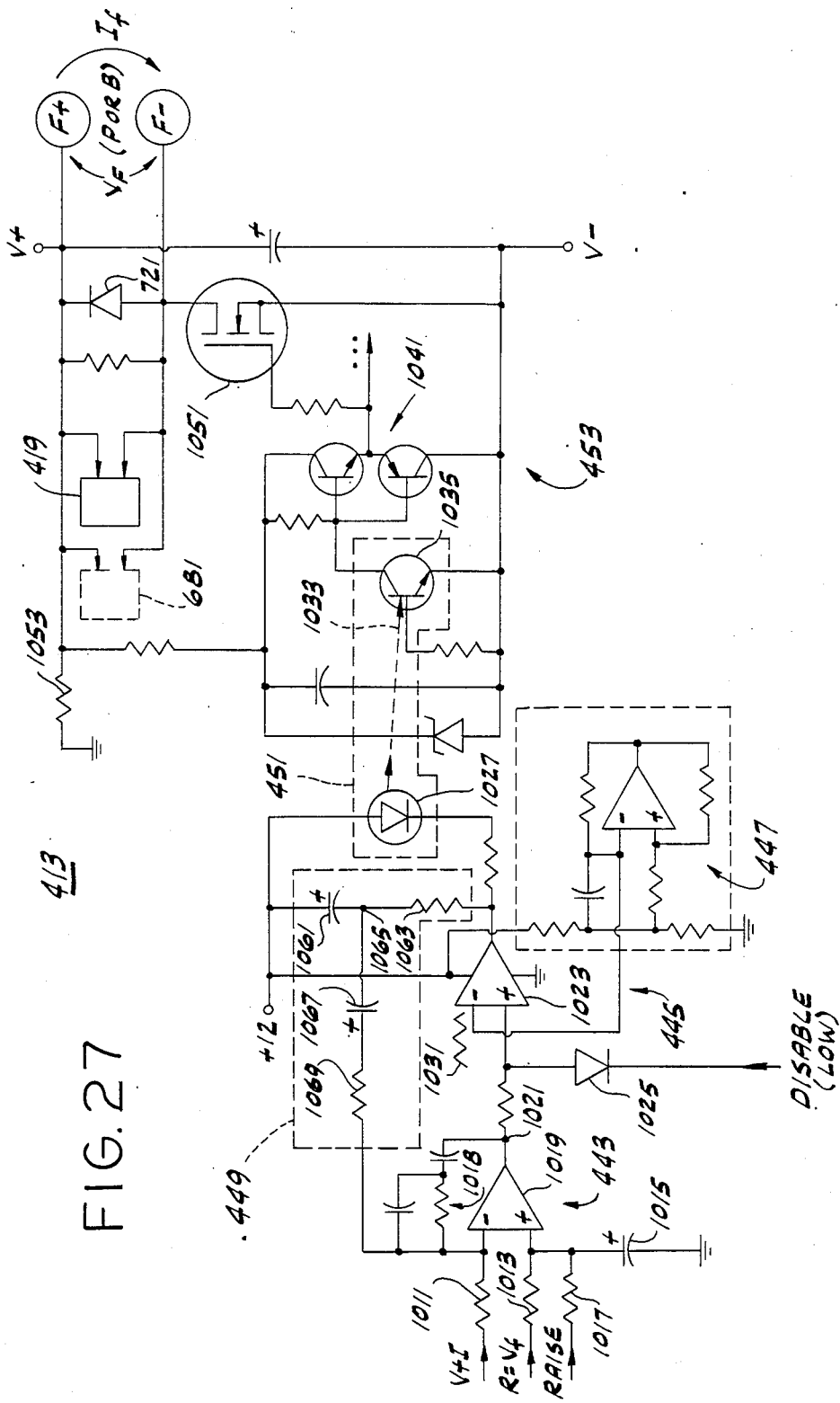
FIG. 27 is a schematic diagram of an energization varying circuit in the block diagram of FIG. 14 for each of the voltage regulators of the regulating apparatus in FIG.

In FIG. 27, energization varying circuit 413 of either regulator AVRP or AVRB is shown in schematic detail. Error amplifier 443 has an inverting (−) input to which the generator output V+I, as sensed by circuit 411 of FIG. 14, is coupled through a 22K ohm resistor 1011. The electrical reference R (same as $V_f$ of FIG. 1) is coupled through another 22K ohm resistor 1013 to the noninverting (+) input of amplifier 443, which input is bypassed by a 1 microfarad capacitor 1015.

As stated earlier, the schematic diagrams of regulators AVRP and AVRB are identical in this preferred embodiment of regulating apparatus. The RAISE line from the collector of transistor 1003 of FIG. 26 is coupled through a 220K ohm resistor 1017 to the noninverting (+) input of amplifier 443 in regulator AVRP as shown in FIG. 27. The RAISE line from the collector of transistor 1007 is coupled through a corresponding 220K ohm resistor to the noninverting (+) input of amplifier 443 in regulator AVRB. When the transistor 1003 RAISE line is held low by that transistor, resistor 1013 and resistor 1017 form a voltage divider which supplies 10/11 (91%) of the reference voltage R to the noninverting input of amplifier 443. When transistor 1003 is turned off by NOR gate 1001, the voltage divider action ceases and reference voltage R (100%) is coupled without voltage division to the noninverting input of amplifier 443. It is emphasized that the percentages 100% and 91% relate to the electrical reference R to which the generator is to be regulated by the respective voltage regulators, and not to levels of actual excitation from a particular one of the regulators. This is because the excitation produced by the regulator in control of the field at any given time varies with the generator loading, and because the excitation produced by the regulator not in control of the field can be zero because the regulator in control is maintaining generator output above the 91% level to which the other regulator is set.

Error amplifier 443 includes a capacitive network 1018 and operational amplifier 1019 that together act as an error integrator to produce an output 1021. Output 1021 is coupled through a 10K resistor to a noninverting (+) input of a comparator 1023 in pulse width modulator circuit 445. A diode 1025 has its anode connected to this noninverting input, and its cathode connected to the DISABLE line from the relay driver in FIG. 25 corresponding to the regulator AVRP or AVRP to which the diode pertains. The pulse width modulator circuit 445 is ordinarily not disabled unless the DISABLE line for the regulator goes low, forcing the noninverting input of comparator 1023 low through diode 1025. When disabled, the output of comparator 1023 is held low, and current continuously flows with 100% duty cycle through a light emitting diode (LED) 1027 in optical coupler 451, causing it to switch power controller 543 off.

In normal operation, oscillator 447 generates a triangular waveform 1031 centered on half the 12 volt supply voltage, and the waveform has a frequency of several kiloHertz. Waveform 1031 is supplied to the inverting (−) input of comparator 1023. If reference R exceeds output V+I then the output 1021 rises until the output of comparator 1023 produces high pulses of increasing width. As a result, the current through the LED in optical coupler 451 flows in pulses of decreasing duty cycle, producing a pulsating light output 1033 of decreasing duty cycle in optical coupler 451. An optically sensitive transistor 1035 is turned on with decreasing duty cycle, causing an inverting transistor switch 1041 in power controller 453 to supply pulses of voltage with increasing duty cycle to a gate of a FET power switch 1051.

Transformer rectifier circuit 463 of FIG. 14 supplies illustratively at least 120 volts DC across a pair of terminals V+ and Vin FIG. 27. When the voltage regulator is supplying field winding current $I_f$, an excitation voltage $V_F$(P OR B) is developed across a pair of regulator output terminals F+ and F−. The F+ terminal is connected to the V+ terminal of the circuit 463 of the power supply. A freewheeling diode 721 in regulator AVRP (designated 725 in AVRB) is connected with cathode to F+ and anode to F−. The excitation voltage is also provided to overexcitation circuit 419 in the regulator (FIG. 14) and to the excitation comparator 681 in the transfer module 325 (FIG. 16). FET power switch 1051 is connected between terminal F− and terminal V−. Additional FET power switches are added in parallel as needed to carry the current $I_f$. A resistor 1053 is connected between terminal V+ and the common for the regulating apparatus.

Stabilizing network 449 includes a 4.7 microfarad capacitor 1061 connected in series with a 22K resistor 1063 between the 12 volt supply voltage and the output of comparator 1023 in the pulse width modulator 445. A voltage develops at a point 1065 which is equal to the average of the pulsating voltage at the output of comparator 1023 and proportional to the duty cycle thereof. Another 4.7 microfarad capacitor 1067 is connected in series with a 120K resistor 1069 between point 1065 and the inverting (−) input of amplifier 1019. Capacitor 1067 provides a stabilizing negative feedback to error amplifier 443 by coupling changes in the duty cycle back to the inverting input of amplifier 1019.

Figure 28:
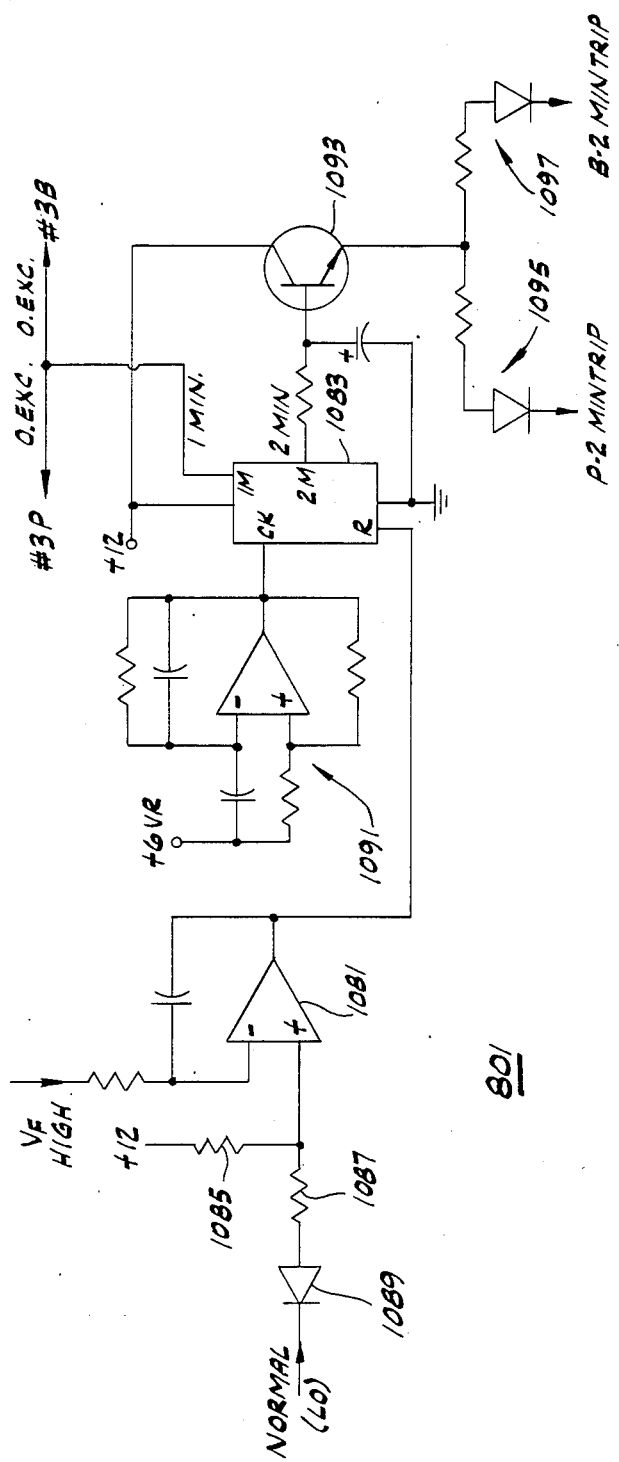
FIG. 28 is schematic diagram of an overexcitation timer circuit in the transfer module of FIG. 16.

In FIG. 28 overexcitation timer 801 of FIG. 16 includes a comparator 1081 which ordinarily provides an output high that keeps a timer chip 1083 normally reset all the time. A resistor 1085 is connected between 12 volt supply voltage and the noninverting input of the comparator 1081. In any mode other than the NORMAL mode this couples 12 volts to that input, completely disabling the comparator 1081 and timer 1083 even if overexcitation occurs. A resistor 1087 is connected in series with a diode 1089 to the NORMAL mode line of FIG. 25 so that a predetermined level of about 3.6 volts in the NORMAL mode is provided instead of 12 volts to the noninverting input. The line $V_F$ high from excitation comparator 681 of FIGS. 16 and 24 is resistively coupled to the inverting (−) input of comparator 1081 of FIG. 28. In this way, comparator 1081 normally produces a high output even in the NORMAL mode. If an overexcitation condition resulting in a sufficient voltage on line $V_F$ high occurs in the NORMAL mode, the comparator 1081 will respond with an output low, however. This releases the reset from timer chip 1083, and permits the timer to run in response to a clock oscillator circuit 1091. If the overexcitation condition persists for at least one minute, a high is output from pin 1M to lines O.EXC. which are connected to AND gates #3P and #4P of FIG. 16. If the overexcitation condition persists for at least two minutes, a high is output from a separate pin 2M of timer chip 1083 to turn a transistor 1093 on. Transistor 1093 connects 12 volt supply voltage to a pair of resistordiode coupling circuits 1095 and 1097 that are connected to the lines P-2MINTRIP and B-2MINTRIP leading to the relay drivers in FIG. 25.

Figure 29:
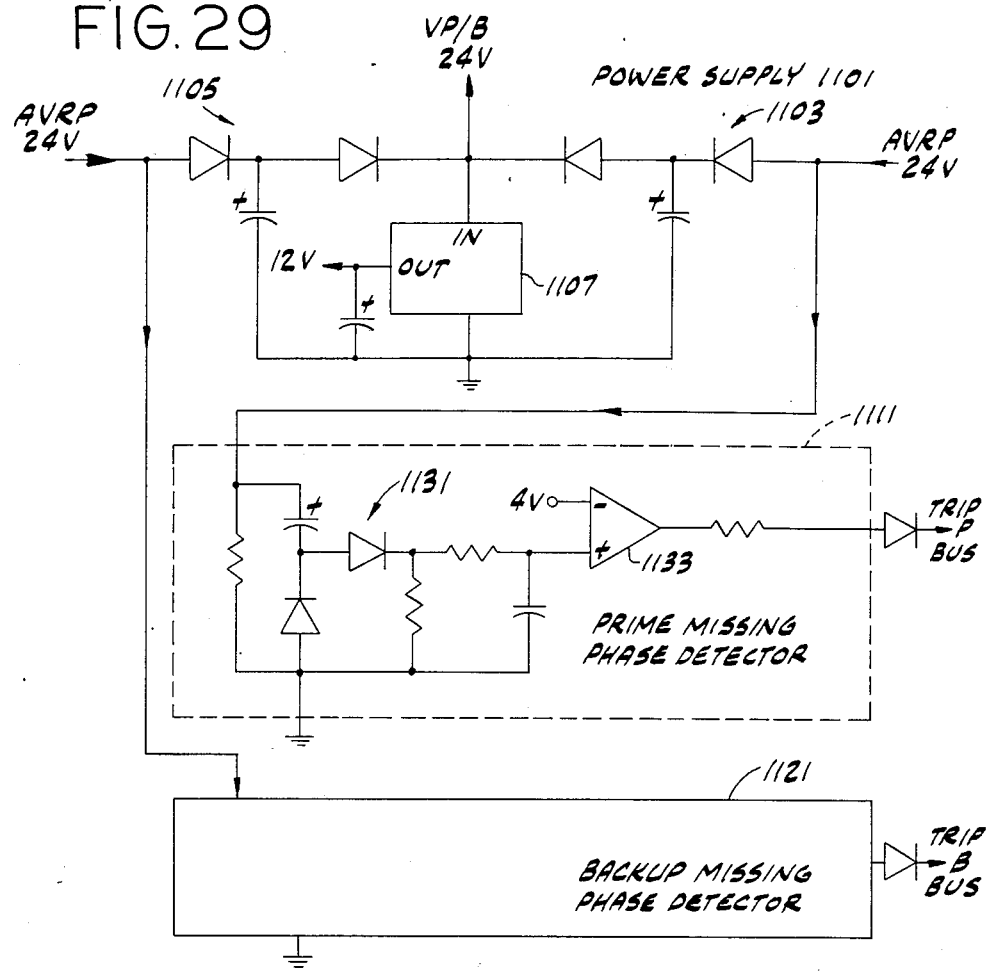
FIG. 29 is a partially block, partially schematic diagram of a power supply and two missing phase detectors in the transfer module of FIG. 16.

In FIG. 29, a power supply 1101 for transfer module 325 derives a DC input at terminal IN from the greater of the 24 volt DC supply voltages from regulators AVRP and AVRB coupled by respective pairs of diodes 1103 and 1105 to a common 24 volt supply line VP/B for the transfer module. A power supply circuit 1107 powered from line VP/B provides 12 volts DC for the transfer module circuitry. The fixed DC voltages of 8, 6 and 4 volts elsewhere in the drawings are obtained from the 12 volts DC by voltage division.

Transfer module 325 also has a Prime Missing Phase Detector 1111 and a Backup Missing Phase Detector 1121 which have identical circuits and are respectively connected at their inputs to the 24 volt lines from regulators AVRP and AVRB. If excessive ripple develops in either 24 volt line, indicative of a missing or dead phase or other power supply malfunction, an activating high is sent to the TRIP P BUS or TRIP B BUS corresponding to the source of the ripple. For example, Detector 1111 is connected to the 24 volt line from regulator AVRP. A circuit 1131 with a coupling capacitor, rectifying diodes and filter provides a ripple-related DC level to the noninverting input of a comparator 1133. If the ripple-related DC level exceeds a fixed 4 volt level at the inverting input, comparator 1133 produces an output high which is resistively coupled to one of the diodes in OR-gate 551 of FIG. 16. The High on the TRIP P BUS trips regulator AVRP.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Transfer apparatus for use with an AC generator having a field winding, the DC energization of which controls the output of the generator, and associated first and second voltage regulators each including means for sensing the output of the generator and means for varying the DC energization of the generator field winding to regulate the output of the generator to a respective reference level, the transfer apparatus comprising:
   means for generating a first signal as a function of the generator output as sensed by the first voltage regulator sensing means and a second signal as a function of the generator output as sensed by the second voltage regulator sensing means;
   means for independently producing an additional signal to which the first and second signals ordinarily have a predetermined relationship; and means for selecting the first or second voltage regulator to energize the generator field winding, the selection depending on whether or not there is a departure of the first signal from the predetermined relationship to the additional signal when the second signal maintains its predetermined relationship thereto.

2. Transfer apparatus as set forth in claim 1 further comprising means for determining whether the output of the generator excessively deviates from the reference level for the first voltage regulator, said selecting means comprising means connected to said determining means for also selecting the second voltage regulator upon an occurrence of such excessive deviation.

3. Transfer apparatus as set forth in claim 1 wherein said means for generating the first and second signals includes means for producing the first and second signals as a function of both the frequency and the magnitude of the output of the generator as sensed by the first and second voltage regulator sensing means respectively.

4. Transfer apparatus as set forth in claim 1 wherein said means for producing the additional signal includes means for providing a signal representing the output of the generator, means for generating an electrical reference and means for generating the additional signal as a function of both the electrical reference and the signal representing the output of the generator.

5. Transfer apparatus as set forth in claim 1 wherein said means for generating the first and second signals includes means for supplying a frequency dependent electrical reference that decreases with frequency of the generator below a predetermined rolloff frequency and means for producing the first and second signals as a function of the frequency dependent electrical reference less the sum of the generator voltage and the generator current as sensed by the first and second voltage regulator sensing means respectively.

6. Transfer apparatus as set forth in claim 5 wherein said means for producing the additional signal includes means for providing a signal representing the output of the generator as the sum of the generator voltage and current, means for generating a frequency dependent electrical reference that decreases with frequency of the generator below a predetermined rolloff frequency and means for generating the additional signal as a function of the difference between the electrical reference and the signal representing the output of the generator.

7. Transfer apparatus as set forth in claim 1 wherein said means for generating the first and second signals includes means for generating the first signal and means for independently generating the second signal so that normally the first and second signals are substantially equal in electrical value to the additional signal, whereby the predetermined relationship is equality.

8. Transfer apparatus as set forth in claim 1 wherein said means for selecting the first or second voltage regulator to energize the generator field winding includes means for determining a first electrical difference between the first signal and the second signal and a second electrical difference between the first signal and the additional signal, and means for preventing the first voltage regulator from energizing the generator field winding upon an excessive value of the first electrical difference occurring simultaneously with an excessive value of the second electrical difference.

9. Transfer apparatus as set forth in claim 1 for use with the associated first and second voltage regulators supplying respective excitations and connected to the field winding of the generator so that the regulator with the greater excitation energizes the field winding, the reference level for the second regulator being lower than the reference level for the first regulator, wherein said means for selecting the first or second voltage regulator to energize the generator field winding includes means for preventing the first voltage regulator from energizing the generator field winding upon said departure of the first signal from the predetermined relationship, and means for raising the second regulator reference level upon said departure to cause the second voltage regulator to regulate the output of the generator to approximately the first regulator reference level.

10. Transfer apparatus as set forth in claim 1 for use with the associated first and second voltage regulators supplying respective excitations and connected to the field winding of the generator so that the regulator with the greater excitation energizes the field winding, wherein said means for selecting the first or second voltage regulator to energize the generator field winding includes means, activated upon said departure of the first signal from the predetermined relationship, for disabling the energization varying means of the first voltage regulator.

11. Transfer apparatus as set forth in claim 1 wherein said means for selecting the first or second voltage regulator to energize the generator field winding includes means for also determining a first electrical difference between the first signal and the additional signal and a second electrical difference between the second signal and the additional signal, and means for displaying an indication that the means for producing the additional signal is in error upon an excessive value of the first electrical difference occurring simultaneously with an excessive value of the second electrical difference.

12. Transfer apparatus as set forth in claim 1 wherein said means for selecting the first or second voltage regulator to energize the generator field winding includes means for also determining a first electrical difference between the first signal and the second signal and a second electrical difference between the second signal and the additional signal, and means for preventing the second voltage regulator from energizing the generator field winding upon an excessive value of the first electrical difference coinciding with an excessive value of the second electrical difference.

13. Transfer apparatus as set forth in claim 1 for use with the associated first and second regulators, each supplying a respective excitation and including means for supplying a frequency-dependent reference level, said transfer apparatus further comprising means for producing a fourth signal upon an excessive deviation of the output of the generator, as sensed by one of the output sensing means, from the frequency-dependent reference level of one of the reference level supplying means; said selecting means including means responsive to the fourth signal for electrically substituting the second voltage regulator for the first voltage regulator to energize the generator field winding, whereby regulation is transferred from the first to the second voltage regulator after the excessive deviation.

14. Transfer apparatus as set forth in claim 1 for use with the first voltage regulator supplying a varying excitation to regulate the output of the generator to a first reference level and the second voltage regulator supplying a varying excitation to regulate the output of the generator to a second lower reference level, and with the voltage regulators connected to the field winding of the generator so that the regulator with the greater excitation energizes the field winding, the transfer apparatus further comprising means for producing a fourth signal upon an excessive deviation of the output of the generator from the first reference level, said selecting means including means connected to said means for producing the fourth signal and responsive to the fourth signal for preventing the first voltage regulator from energizing the generator field winding and means for raising the second reference level after the fourth signal occurs, to cause the second voltage regulator to regulate the output of the generator to approximately the first reference level, whereby regulation to such level is transferred from the first to the second voltage regulator.

15. Regulating apparatus for use with an AC generator having a field winding the DC energization of which controls the output of the generator, comprising:
   first and second voltage regulators each including means for sensing the output of the generator and means for varying the DC energization of the generator field winding to regulate the output of the generator to a respective reference level;
   means for generating a first signal as a function of the generator output as sensed by the first voltage regulator sensing means and a second signal as a function of the generator output as sensed by the second voltage regulator sensing means;
   means for independently producing an additional signal to which the first and second signals ordinarily have a predetermined relationship; and
   means for selecting the first or second voltage regulator to energize the generator field winding, the selection depending on whether or not there is a departure of the first signal from the predetermined relationship to the additional signal when the second signal maintains its predetermined relationship thereto.

16. Regulating apparatus as set forth in claim 15 wherein said means for generating the first and second signals includes means for also generating an error signal as a function of both the generator output and the reference level for the first voltage regulator, said energization varying means of said first voltage regulator being responsive to said error signal.

17. Regulating apparatus as set forth in claim 15 wherein each of said voltage regulators produces a respective excitation and includes means for supplying a frequency-dependent reference level, said transfer apparatus further comprising means for producing a fourth signal upon an excessive deviation of the output of the generator, as sensed by one of the output sensing means, from the frequency-dependent reference level of one of the reference level supplying means; said selecting means including means responsive to the fourth signal for electrically substituting the second voltage regulator for the first voltage regulator to energize the generator field winding, whereby regulation is transferred from the first to the second voltage regulator after the excessive deviation.

18. Regulating apparatus as set forth in claim 15 wherein said first voltage regulator supplies a varying excitation to regulate the output of the generator to a first reference level and the second voltage regulator supplies a varying excitation to regulate the output of the generator to a second lower reference level, and the voltage regulators are connected to the field winding of the generator so that the regulator with the greater excitation energizes the field winding, the regulating apparatus further comprising means for producing a fourth signal upon an excessive deviation of the output of the generator from the first reference level, and said selecting means including means responsive to the fourth signal for preventing the first voltage regulator from energizing the generator field winding and means for raising the second reference level after the fourth signal occurs, to cause the second voltage regulator to regulate the output of the generator to approximately the first reference level, whereby regulation to such level is transferred from the first to the second voltage regulator.

19. Transfer apparatus for use with an AC generator having a field winding, the DC energization of which controls the output of the generator, and associated first and second voltage regulators connected so that the first voltage regulator ordinarily energizes the field winding, each voltage regulator including means for sensing the output of the generator, means for supplying a frequency-dependent reference level, and means for varying the DC energization of the generator field winding to regulate the output of the generator to the frequency-dependent reference level, the transfer apparatus comprising:
   means for producing a signal upon an excessive deviation of the output of the generator, as sensed by one of the output sensing means, from the frequency-dependent reference level of one of the reference level supplying means; and
   means connected to said signal producing means and responsive to the signal for electrically substituting the second voltage regulator for the first voltage regulator to energize the generator field winding, whereby regulation is transferred from the first to the second voltage regulator after the excessive deviation.

20. Transfer apparatus as set forth in claim 19 wherein the first and second voltage regulators supply respective excitations, and said producing means includes means for coupling the signal to said substituting means, said transfer apparatus further comprising means for disabling said coupling means when the excitation from the first voltage regulator is less than the excitation from the second voltage regulator and the generator output is higher than the frequency-dependent reference level.

21. Transfer apparatus as set forth in claim 19 wherein the first and second voltage regulators supply respective excitations, the transfer apparatus further comprising means for comparing the excitation from the first voltage regulator to the excitation from the second voltage regulator, said producing means including means for providing the signal upon an excessive deviation of the output of the generator above the first regulator reference level and providing a separate signal upon an excessive deviation of the output of the generator below the first regulator reference level, said producing means further including means connected to said comparing means for coupling the first-named signal to said substituting means unless the first regulator excitation is less than the second regulator excitation and for coupling the separate signal as the signal to said substituting means unless the first regulator excitation is greater than the second regulator excitation.

22. Transfer apparatus as set forth in claim 19 further comprising means for detecting whether the first and second voltage regulators are both supplying more than a predetermined high level of excitation, said producing means including means connected to said detecting means for coupling the signal to said substituting means unless the first and second voltage regulators are both supplying more than the predetermined high level of excitation.

23. Transfer apparatus as set forth in claim 19 further comprising means for detecting whether the first and second voltage regulators are both supplying less than a predetermined low level of excitation, said signal producing means including means connected to said detecting means for coupling said first-named signal to said substituting means unless the first and second voltage regulators are both supplying less than the predetermined low level of excitation.

24. Regulating apparatus for use with an AC generator having a field winding, the DC energization of which controls the output of the generator, comprising:
   first and second voltage regulators connected so that the first voltage regulator ordinarily energizes the field winding, each voltage regulator including means for sensing the output of the generator, means for supplying a frequency-dependent reference level, and means for varying the DC energization of the generator field winding to regulate the output of the generator to the frequency dependent reference level;
   means for producing a signal upon an excessive deviation of the output of the generator, as sensed by one of the output sensing means, from the frequency-dependent reference level of one of the reference level supplying means; and
   means connected to said signal producing means and responsive to the signal for electrically substituting said second voltage regulator for said first voltage regulator to energize the generator field winding, whereby regulation is transferred from the first to the second voltage regulator after the excessive deviation.

25. Regulating apparatus as set forth in claim 24 wherein said first and second voltage regulators supply respective excitations and said signal producing means includes means for coupling the signal to said substituting means, the transfer apparatus further comprising means for disabling said coupling means when the excitation from said first voltage regulator is greater than the excitation from said second voltage regulator and the generator output is below the frequency-dependent reference level.

26. Regulating apparatus as set forth in claim 24 wherein said reference level supplying means in each voltage regulator includes means for producing the electrical reference so that it decreases with frequency of the generator below a predetermined rolloff frequency and said output sensing means includes means for producing a variable DC electrical level proportional to a vector sum of the generator output voltage and the generator output current.

27. Regulating apparatus as set forth in claim 24 wherein said substituting means includes means connected to said voltage regulators for selectively reversing the roles of said first and second voltage regulators so that said second voltage regulator ordinarily energizes the field winding and means connected to said reversing means and responsive to the signal of excessive deviation for electrically substituting said first voltage regulator for said second voltage regulator to energize the generator field winding, whereby regulation is transferred from the second to the first voltage regulator after the excessive deviation.

28. Transfer apparatus for use with an AC generator having a field winding, the DC energization of which controls the output of the generator, a first voltage regulator for supplying a varying excitation to regulate the output of the generator to a first reference level and a second voltage regulator for supplying a varying excitation to regulate the output of the generator to a second lower reference level, wherein the voltage regulators are connected to the field winding of the generator so that the regulator with the greater excitation energizes the field winding, the transfer apparatus comprising:
   means for producing a signal upon an excessive deviation of the output of the generator from the first reference level;
   means connected to said signal producing means and responsive to the signal for preventing the first voltage regulator from energizing the generator field winding; and
   means for raising the second reference level after the signal occurs, to cause the second voltage regulator to regulate the output of the generator to approximately the first reference level, whereby regulation to such level is transferred from the first to the second voltage regulator.

29. Transfer apparatus as set forth in claim 28 wherein said producing means includes means for coupling said signal to said preventing means and the transfer apparatus further comprises means for disabling said coupling means when the excitation from the first voltage regulator is less than the excitation from the second voltage regulator and the generator output is higher than the frequency-dependent reference level.

30. Transfer apparatus as set forth in claim 28 further comprising means for comparing the excitation from the first voltage regulator to the excitation from the second voltage regulator, said producing means including means for providing the signal upon an excessive deviation of the output of the generator above the first reference level and providing a separate signal upon an excessive deviation of the output of the generator below the first reference level, said producing means further including means connected to said comparing means for coupling the first-named signal as the signal to said preventing means unless the first regulator excitation is less than the second regulator excitation and for coupling the separate signal as the signal to said preventing means unless the first regulator excitation is greater than the second regulator excitation.

31. Transfer apparatus as set forth in claim 28 further comprising means for detecting whether the first and second voltage regulators are both supplying more than a predetermined high level of excitation, said producing means including means connected to said detecting means for coupling the signal to said preventing means unless the first and second voltage regulators are both supplying more than the predetermined high level of excitation.

32. Transfer apparatus as set forth in claim 28 further comprising means for detecting whether the first and second voltage regulators are both supplying less than a predetermined low level of excitation, said signal producing means including means connected to said detecting means for coupling said first signal to said preventing means unless the first and second voltage regulators are both supplying less than the predetermined low level of excitation.

33. Transfer apparatus as set forth in claim 28 further comprising means for supplying a second signal to said raising means, said raising means including means responsive to the second signal for interchanging the first and second reference levels.

34. Transfer apparatus as set forth in claim 33 further comprising means responsive to the second signal for producing a third signal upon an excessive deviation of the output of the generator from the second reference level, and means responsive to the third signal for preventing the second voltage regulator from energizing the generator field winding, whereby the first regulator is made to act as a backup for the second regulator.

35. Regulating apparatus for use with an AC generator having a field winding, the DC energization of which controls the output of the generator, comprising:
a first voltage regulator for supplying a varying excitation to regulate the output of the generator to a first reference level and a second voltage regulator for supplying a varying excitation to regulate the output of the generator to a second lower reference level, wherein said voltage regulators are connected so that the regulator with the greater excitation provides the DC energization;
means for producing a signal upon an excessive deviation of the output of the generator from the first reference level;
means connected to said signal producing means and responsive to the signal for preventing said first voltage regulator from energizing the generator field winding; and
means for raising the second reference level after the signal occurs, to cause said second voltage regulator to regulate the output of the generator to approximately the first reference level, whereby regulation to such level is transferred from said first to said second voltage regulator.

36. A method of operating transfer apparatus for use with an AC generator having a field winding, the DC energization of which controls the output of the generator, and with a first voltage regulator for supplying a varying excitation to regulate the output of the generator to a first reference level and a second voltage regulator for supplying a varying excitation to regulate the output of the generator to a second lower reference level, wherein the voltage regulators are connected to the field winding of the generator so that the regulator with the greater excitation energizes the field winding, the method comprising the steps of:
producing a signal upon an excessive deviation of the output of the generator from the first reference level;
in response to the signal, preventing the first voltage regulator from energizing the generator field winding; and
raising the second reference level after the signal occurs, to cause the second voltage regulator to regulate the output of the generator to approximately the first reference level, whereby regulation to such level is transferred from the first to the second voltage regulator.

37. A method of operating transfer apparatus as set forth in claim 36 further comprising the steps of comparing the excitation from the first voltage regulator to the excitation from the second voltage regulator and supplying a second signal when the excitation from the first voltage regulator is greater than the excitation from the second voltage regulator and the generator output deviates above the reference level, and delaying the preventing step until the second signal is present.

38. A method of operating transfer apparatus as set forth in claim 36 further comprising the steps of comparing the excitation from the first voltage regulator to the excitation from the second voltage regulator and supplying a second signal when the excitation from the first voltage regulator is less than the excitation from the second voltage regulator and the generator output deviates below the reference level, and delaying the preventing step until the second signal is present.

* * * * *